(12) United States Patent
Islam et al.

(10) Patent No.: US 9,648,044 B2
(45) Date of Patent: *May 9, 2017

(54) SECURING COMMUNICATION OVER A NETWORK USING CLIENT SYSTEM AUTHORIZATION AND DYNAMICALLY ASSIGNED PROXY SERVERS

(71) Applicant: VIDDER, INC., Campbell, CA (US)

(72) Inventors: Junaid Islam, San Jose, CA (US); Brent Bilger, Los Altos Hills, CA (US); Ted Schroeder, Saratoga, CA (US)

(73) Assignee: VIDDER, INC., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/748,167

(22) Filed: Jun. 23, 2015

(65) Prior Publication Data
US 2016/0028694 A1    Jan. 28, 2016

Related U.S. Application Data

(63) Continuation of application No. 13/794,689, filed on Mar. 11, 2013, now Pat. No. 9,065,856.
(Continued)

(51) Int. Cl.
*G06F 12/00* (2006.01)
*H04L 29/06* (2006.01)
(Continued)

(52) U.S. Cl.
CPC .............. *H04L 63/20* (2013.01); *G06F 21/31* (2013.01); *G06F 21/57* (2013.01);
(Continued)

(58) Field of Classification Search
CPC ...... G06F 21/31; G06F 21/57; G06F 21/6218; G06F 2221/2111; G06F 2221/2113;
(Continued)

(56) References Cited

U.S. PATENT DOCUMENTS

| 6,226,750 B1 | 5/2001 | Trieger |
| 6,366,577 B1 | 4/2002 | Donovan |

(Continued)

FOREIGN PATENT DOCUMENTS

| CN | 1514569 A | 7/2004 |
| GB | 2367725 A | 4/2002 |

(Continued)

OTHER PUBLICATIONS

Reimer et al., "Federal Identity Access Broker Pattern for Cloud Computing," Network-Based Information System (NBIS), 2013 16th International Conference on IEEE, 2013.
(Continued)

*Primary Examiner* — Joseph P Hirl
*Assistant Examiner* — Sayed Beheshti Shirazi
(74) *Attorney, Agent, or Firm* — Morgan, Lewis & Bockius LLP

(57) ABSTRACT

A method for securing communication over a network is disclosed. A trust broker system receives a request to connect to applications and resources from a client system. The trust broker system determines whether the client system is authorized to connect to the requested applications and resources. In response to determining the client system has authorization to connect to the requested applications and resources, the trust broker system determines, from a plurality of potential proxy servers, a proxy server associated with the requested server system and transmits an identification value for the client system to the requested server system. The trust broker system then transmits the identification value to the client system and transmits contact information for the determined proxy server to the client system, wherein all communication between the client system and the requested server system passes through the proxy server.

14 Claims, 13 Drawing Sheets

Related U.S. Application Data

(60) Provisional application No. 61/759,963, filed on Feb. 1, 2013.

(51) Int. Cl.
| | |
|---|---|
| *G06F 21/57* | (2013.01) |
| *G06F 21/31* | (2013.01) |
| *G06F 21/62* | (2013.01) |
| *H04L 29/08* | (2006.01) |

(52) U.S. Cl.
CPC ...... *G06F 21/6218* (2013.01); *H04L 63/0281* (2013.01); *H04L 63/0428* (2013.01); *H04L 63/08* (2013.01); *H04L 63/0876* (2013.01); *H04L 63/10* (2013.01); *H04L 63/105* (2013.01); *H04L 67/2809* (2013.01); *H04L 67/42* (2013.01); *G06F 2221/2111* (2013.01); *G06F 2221/2113* (2013.01)

(58) Field of Classification Search
CPC . H04L 63/0281; H04L 63/0428; H04L 63/08; H04L 63/0876; H04L 63/10; H04L 63/105; H04L 63/20; H04L 67/2809; H04L 67/42
USPC ....... 726/4, 5, 7, 12; 713/155, 156, 158, 170
See application file for complete search history.

(56) References Cited

U.S. PATENT DOCUMENTS

| | | |
|---|---|---|
| 7,131,000 B2 | 10/2006 | Bradee |
| 7,155,738 B2 | 12/2006 | Zhu et al. |
| 7,428,750 B1 | 9/2008 | Dunn et al. |
| 7,536,544 B2 | 5/2009 | Xiao |
| 7,562,382 B2 | 7/2009 | Hinton et al. |
| 7,596,530 B1 | 9/2009 | Glasberg |
| 7,644,446 B2 | 1/2010 | Strom et al. |
| 7,657,639 B2 | 2/2010 | Hinton |
| 7,673,046 B2 | 3/2010 | Lehew et al. |
| 7,814,531 B2 | 10/2010 | Khosravi et al. |
| 7,831,047 B2 | 11/2010 | Rowe |
| 7,900,046 B2 | 3/2011 | Baliga et al. |
| 8,141,139 B2 | 3/2012 | Hinton et al. |
| 8,196,177 B2 | 6/2012 | Hinton, I |
| 8,214,394 B2 | 7/2012 | Krishnaprasad et al. |
| 8,214,634 B1 | 7/2012 | Steele et al. |
| 8,255,984 B1 | 8/2012 | Ghostine et al. |
| 8,359,360 B2 | 1/2013 | Logue et al. |
| 8,375,430 B2 | 2/2013 | Grewal et al. |
| 8,382,593 B2 | 2/2013 | Edgren et al. |
| 8,396,949 B2 | 3/2013 | Bubolz et al. |
| 8,443,435 B1 | 5/2013 | Schroeder |
| 8,447,976 B2 | 5/2013 | Jain et al. |
| 8,522,019 B2 | 8/2013 | Michaelis |
| 8,590,029 B2 | 11/2013 | Vitaletti |
| 8,707,451 B2 | 4/2014 | Ture et al. |
| 8,782,759 B2 | 7/2014 | Hinton et al. |
| 8,793,769 B2 | 7/2014 | Marcia et al. |
| 8,843,997 B1 | 9/2014 | Hare |
| 8,856,957 B1 | 10/2014 | Roth et al. |
| 8,875,249 B2 | 10/2014 | Ture et al. |
| 8,903,315 B2 | 12/2014 | Pering et al. |
| 2002/0095571 A1 | 7/2002 | Bradee |
| 2002/0156965 A1 | 10/2002 | Gusler et al. |
| 2002/0184507 A1 | 12/2002 | Makower et al. |
| 2003/0023689 A1 | 1/2003 | Brown et al. |
| 2003/0130960 A1 | 7/2003 | Fraser et al. |
| 2003/0140131 A1 | 7/2003 | Chandrashekhar et al. |
| 2003/0167308 A1 | 9/2003 | Schran |
| 2003/0220880 A1 | 11/2003 | Lao et al. |
| 2004/0098620 A1 | 5/2004 | Shay |
| 2004/0128392 A1* | 7/2004 | Blakley, III .......... H04L 63/083 709/229 |
| 2004/0187031 A1 | 9/2004 | Liddle |
| 2004/0220878 A1 | 11/2004 | Lao et al. |
| 2004/0259633 A1 | 12/2004 | Gentles et al. |
| 2005/0015586 A1 | 1/2005 | Brickell |
| 2005/0097321 A1 | 5/2005 | Zhu et al. |
| 2005/0213584 A1 | 9/2005 | Donovan |
| 2005/0223217 A1* | 10/2005 | Howard .................. G06F 21/31 713/155 |
| 2005/0223413 A1 | 10/2005 | Duggan et al. |
| 2005/0238034 A1 | 10/2005 | Gillespie et al. |
| 2006/0020679 A1 | 1/2006 | Hinton et al. |
| 2006/0059544 A1 | 3/2006 | Guthrie et al. |
| 2006/0090074 A1 | 4/2006 | Matoba |
| 2006/0156026 A1 | 7/2006 | Utin |
| 2006/0212931 A1 | 9/2006 | Shull et al. |
| 2006/0236382 A1 | 10/2006 | Hinton et al. |
| 2007/0006282 A1 | 1/2007 | Durham et al. |
| 2007/0101400 A1 | 5/2007 | Freeman et al. |
| 2007/0208745 A1 | 9/2007 | Ture et al. |
| 2007/0208755 A1 | 9/2007 | Bhatkar et al. |
| 2008/0005359 A1 | 1/2008 | Khosravi et al. |
| 2008/0010665 A1 | 1/2008 | Hinton et al. |
| 2008/0034420 A1 | 2/2008 | Chang |
| 2008/0046984 A1* | 2/2008 | Bohmer .............. H04L 63/0853 726/5 |
| 2008/0109904 A1 | 5/2008 | In et al. |
| 2008/0112551 A1 | 5/2008 | Forbes et al. |
| 2008/0222174 A1 | 9/2008 | Lyman |
| 2008/0320567 A1 | 12/2008 | Shulman et al. |
| 2009/0070863 A1* | 3/2009 | Shimizu .............. H04L 63/0236 726/7 |
| 2009/0083403 A1 | 3/2009 | Xu et al. |
| 2009/0150297 A1 | 6/2009 | Richard |
| 2009/0182592 A1 | 7/2009 | Ballaro et al. |
| 2009/0217033 A1 | 8/2009 | Costa et al. |
| 2009/0259753 A1 | 10/2009 | Hinton et al. |
| 2009/0319781 A1 | 12/2009 | Byrum et al. |
| 2010/0054480 A1 | 3/2010 | Schneider |
| 2010/0122333 A1 | 5/2010 | Noe |
| 2010/0189260 A1 | 7/2010 | Ramanathan et al. |
| 2010/0242083 A1 | 9/2010 | Begum et al. |
| 2010/0242099 A1 | 9/2010 | Tsao |
| 2010/0313016 A1 | 12/2010 | Zhang et al. |
| 2010/0313276 A1 | 12/2010 | Banti et al. |
| 2010/0325710 A1 | 12/2010 | Etchegoyen |
| 2011/0013637 A1 | 1/2011 | Xu et al. |
| 2011/0047381 A1 | 2/2011 | Ganesan et al. |
| 2011/0061103 A1* | 3/2011 | Salkewicz .............. H04L 12/24 726/21 |
| 2011/0078775 A1 | 3/2011 | Yan |
| 2011/0145565 A1* | 6/2011 | Kol ...................... H04L 12/58 713/155 |
| 2012/0022928 A1 | 1/2012 | Wu |
| 2012/0084570 A1 | 4/2012 | Kuzin et al. |
| 2012/0144464 A1 | 6/2012 | Fakhrai et al. |
| 2012/0164982 A1 | 6/2012 | Klein |
| 2012/0331532 A1 | 12/2012 | Walters et al. |
| 2013/0107889 A1 | 5/2013 | Barabash et al. |
| 2013/0185799 A1 | 7/2013 | Pfeifer et al. |
| 2013/0191494 A1* | 7/2013 | Sidhu ..................... H04L 67/34 709/217 |
| 2013/0219164 A1 | 8/2013 | Hamid |
| 2013/0275376 A1 | 10/2013 | Hudlow et al. |
| 2013/0276086 A1 | 10/2013 | Yu |
| 2013/0318577 A1 | 11/2013 | Bulusu et al. |
| 2013/0326228 A1 | 12/2013 | Utin |
| 2014/0006598 A1 | 1/2014 | Uola |
| 2014/0007229 A1 | 1/2014 | Smith et al. |
| 2014/0013396 A1 | 1/2014 | Field-Eliot et al. |
| 2014/0075184 A1 | 3/2014 | Gorbach et al. |
| 2014/0090033 A1 | 3/2014 | Lerner et al. |
| 2014/0096199 A1* | 4/2014 | Dave .................... G06F 21/604 726/4 |
| 2014/0122873 A1* | 5/2014 | Deutsch ................ H04L 63/20 713/158 |
| 2014/0157370 A1 | 6/2014 | Plattner et al. |
| 2014/0223178 A1 | 8/2014 | Islam et al. |

(56) References Cited

U.S. PATENT DOCUMENTS

FOREIGN PATENT DOCUMENTS

| WO | WO 2008/021454 | 2/2008 |
| WO | WO 2009/136795 | 11/2009 |
| WO | WO 2012/091810 | 7/2012 |

OTHER PUBLICATIONS

Olson et al., "Trust Negotiation as an Authorization Service for Web Services," ICDEW, 2006, 2013 IEEE 29th International Conference on Data Engineering Workshops (ICDEW), 2013 IEEE 29th International Conference on Data Engineering Workshops (ICDEW) 2006, pp. 21.
Vidder Inc., Invitation to Pay Additional Fees and Partial Search Report, PCT/US2014/013235, Aug. 4, 2014, 5 pgs.
Vidder Inc., International Search Report and Written Opinion, PCT/US2014/013235, Nov. 6, 2014, 15 pgs.
Vidder Inc., International Preliminary Report on Patentability, PCT/US2014/013235, Aug. 4, 2015, 10 Pgs.

* cited by examiner

SECURING COMMUNICATION OVER A NETWORK USING CLIENT SYSTEM AUTHORIZATION AND DYNAMICALLY ASSIGNED PROXY SERVERS

CROSS-REFERENCE TO RELATED APPLICATIONS

This application is a continuation of U.S. application Ser. No. 13/794,689, filed Mar. 11, 2013, entitled "Securing Communication over a Network Using Client System Authorization and Dynamically Assigned Proxy Servers," which claims priority from U.S. Provisional Patent Application Ser. No. 61/759,963, filed Feb. 1, 2013, both of which are incorporated herein by reference in their entirety.

This application is further related to (1) U.S. application Ser. No. 13/794,532, filed Mar. 11, 2013, entitled "Securing Communication over a Network using Client Integrity Verification," (2) U.S. application Ser. No. 13/794,574, filed Mar. 11, 2013, entitled "Securing Communication over a Network Using User Identity Verification," (3) U.S. application Ser. No. 13/794,607, filed Mar. 11, 2013, entitled "Network Client Software and System Validation," (4) U.S. application Ser. No. 13/794,644, filed Mar. 11, 2013, entitled "Dynamically Configured Connection to a Network Trust Broker," (5) U.S. application Ser. No. 13/794,668, filed Mar. 11, 2013, entitled "Securing Organizational Computing Assets over a Network Using Virtual Domains," all of which are incorporated herein by reference in their entirety.

TECHNICAL FIELD

The disclosed implementations relate to the field of computer networks generally and in particular to securing assets and communication on a computer network.

BACKGROUND

Computer communication networks have become the de facto method of communication for the modern world. In addition to communication between private citizens, various organizations use computer communication networks to communicate, share information, and share documents. Much of this communication is transmitted over non-private computer networks (such as the Internet).

Organizations, such as corporations and governments, often need to communicate sensitive information over the Internet. As such, being able to securely transmit the information over the Internet is very important. Some organizations use encryption techniques to attempt to secure information crossing the Internet unreadable to non-authorized parties. Some organizations use virtual private networks (VPNs) to secure their computers and system.

Additionally, large organizations typically desire to make data and services available to users who are located remotely from the computer systems that store the data and provide the services. However, by making these resources available over a public network also makes them more vulnerable to a malicious attack.

SUMMARY

In accordance with some implementations, a method for protecting application servers from network-based attacks and verifying the security posture of end client systems is disclosed. The method is performed on a trust broker system having one or more processors and memory storing one or more programs for execution by the one or more processors. The trust broker system receives a request from a user agent associated with a client system remote from the trust broker to connect to applications and resources associated with the trust broker. In response to the request to connect with the server system, the trust broker system verifies the integrity of the client system and verifies the identity of a user of the client system. In response to verifying the identity of the user and the integrity of the client system, the trust broker system determines the access level permitted to the identified user and based on the access level, the trust broker system determines which applications and resources the identified user is authorized to access. In accordance with a determination that the user is authorized to access the requested applications and resources, the trust broker system establishes a connection with the user agent. The trust broker system transmits session information to the server system that provides the requested applications and resources, wherein the transmitted session information identifies the requesting user agent. The trust broker system sends the user agent connection information, wherein the connection information enables the requesting user agent to connect to the requested server system.

In accordance with some implementations, a trust broker system for protecting application servers from network-based attacks and verifying the security posture of end client systems is disclosed. The trust broker system has one or more processors and memory storing one or more programs to be executed by the one or more processors. The one or more programs include instructions for receiving a request from a user agent associated with a client system remote from the trust broker to connect to applications and resources associated with the trust broker. In response to the request to connect with the server system, the one or more programs further include instructions for verifying the integrity of the client system and verifying the identity of a user of the client system. In response to verifying the identity of the user and the integrity of the client system, the one or more programs further include instructions for determining the access level permitted to the identified user and based on the access level determining which applications and resources the identified user is authorized to access. In accordance with a determination that the user is authorized to access the requested applications and resources, establishing a connection with the user agent. The one or more programs further include instructions for transmitting session information to the server system that provides the requested applications and resources, wherein the transmitted session information identifies the requesting user agent. The one or more programs further include instructions for sending the user agent connection information, wherein the connection information enables the requesting user agent to connect to the requested server system.

In accordance with some implementations, a non-transitory computer readable storage medium storing one or more programs configured for execution by a trust broker system is disclosed. The one or more programs also include instructions for receiving a request from a user agent associated with a client system remote from the trust broker to connect to applications and resources associated with the trust broker. In response to the request to connect with the server system, the one or more programs further include instructions for verifying the integrity of the client system and verifying the identity of a user of the client system. In response to verifying the identity of the user and the integrity of the client system, the one or more programs further include instructions for determining the access level permitted to the identified user and based on the access level determining which applications and resources the identified user is authorized to access. In accordance with a determination that the user is authorized to access the requested applications and resources, establishing a connection with the user agent. The one or more programs further include instructions for transmitting session information to the server system that provides the requested applications and resources, wherein the transmitted session information identifies the requesting user agent. The one or more programs further include instructions for sending the user agent connection information, wherein the connection information enables the requesting user agent to connect to the requested server system.

In accordance with some implementations, a method for securing communication over a network is disclosed. The method is performed on a server system having one or more processors and memory storing one or more programs for execution by the one or more processors. The server system receives a first encrypted user identifier from a trust broker system associated with the server system, the first encrypted user identifier including information identifying a user of a client system verified by the trust broker system. The server system receives a connection request packet from a first client system. The server system then receives a second encrypted user identifier from the first client system. The server system determines whether first encrypted user identifier matches the second encrypted user identifier. In accordance with a determination that the first encrypted user identifier matches the second encrypted user identifier, the server system establishes an encrypted connection with the first client system.

In accordance with some implementations, a server system for securing communication over a network is disclosed. The server system has one or more processors and memory storing one or more programs to be executed by the one or more processors. The one or more programs include instructions for receiving a first encrypted user identifier from a trust broker system associated with the server system, the first encrypted user identifier including information identifying a user of a client system verified by the trust broker system. The one or more programs include instructions for receiving a connection request packet from a first client system. The one or more programs include instructions for receiving a second encrypted user identifier from the first client system. The one or more programs include instructions for determining whether first encrypted user identifier matches the second encrypted user identifier. The one or more programs include instructions for, in accordance with a determination that the first encrypted user identifier matches the second encrypted user identifier, establishing an encrypted connection with the first client system.

In accordance with some implementations, a non-transitory computer readable storage medium storing one or more programs configured for execution by a server system is disclosed. The one or more programs also include instructions for receiving a first encrypted user identifier from a trust broker system associated with the server system, the first encrypted user identifier including information identifying a user of a client system verified by the trust broker system. The one or more programs include instructions for receiving a connection request packet from a first client system. The one or more programs include instructions for receiving a second encrypted user identifier from the first client system. The one or more programs include instructions for determining whether first encrypted user identifier matches the second encrypted user identifier. The one or more programs include instructions for, in accordance with a determination that the first encrypted user identifier matches the second encrypted user identifier, establishing an encrypted connection with the first client system.

In accordance with some implementations, a method for validating a client system is disclosed. The method is performed on a trust broker system having one or more processors and memory storing one or more programs for execution by the one or more processors. The trust broker system receives a request to connect to a server system from a previously authorized client system, wherein the client system has an associated user agent. The trust broker system determines the machine fingerprint associated with the client system, wherein the fingerprint is a digital value that represents all software installed on the client system. Based on the machine finger print, the trust broker determines whether the client system has software installed since the previous authorization. In accordance with a determination that the client system does have newly installed software, the trust broker system transmits instructions to evaluate the newly installed software and receives the results of the evaluation from the client system establishes an encrypted connection with the first client system.

In accordance with some implementations, a trust broker system validating a client system is disclosed. The trust broker system has one or more processors and memory storing one or more programs to be executed by the one or more processors. The one or more programs include instructions for receiving a request to connect to a server system from a previously authorized client system, wherein the client system has an associated user agent. The one or more programs include instructions for determining the machine fingerprint associated with the client system, wherein the fingerprint is a digital value that represents all software installed on the client system. The one or more programs include instructions for, based on the machine finger print, determining whether the client system has software installed since the previous authorization. The one or more programs include instructions for, in accordance with a determination that the client system does have newly installed software, transmitting instructions to evaluate the newly installed software and receiving the results of the evaluation from the client system establishes an encrypted connection with the first client system.

In accordance with some implementations, a non-transitory computer readable storage medium storing one or more programs configured for execution by a trust broker system is disclosed. The one or more programs also include instructions for receiving a request to connect to a server system from a previously authorized client system, wherein the client system has an associated user agent. The one or more programs include instructions for determining the machine fingerprint associated with the client system, wherein the fingerprint is a digital value that represents all software installed on the client system. The one or more programs include instructions for, based on the machine finger print, determining whether the client system has software installed since the previous authorization. The one or more programs include instructions for, in accordance with a determination that the client system does have newly installed software, transmitting instructions to evaluate the newly installed software and receiving the results of the evaluation from the client system establishes an encrypted connection with the first client system.

In accordance with some implementations, a method for connecting to a trust broker system is disclosed. The method is performed on a client device having one or more processors and memory storing one or more programs for execution by the one or more processors. The client device connects to a trust broker system upon start-up of the device, wherein the device is not enabled to connect to any other system. The client device transmits information identifying the electronic device to the trust broker system. The client device receives, from the trust broker, information that enables the client device to connect to a server system, wherein the trust broker determines the appropriate server system based on the client device. The client device downloads, from the server system, further instructions for performing the one or more tasks associated with the client device; wherein the downloaded instructions are only retained for the current session.

In accordance with some implementations, a client device for connecting to a trust broker system is disclosed. The client device has one or more processors and memory storing one or more programs to be executed by the one or more processors. The one or more programs include instructions for connecting to a trust broker system upon start-up of the device, wherein the device is not enabled to connect to any other system. The one or more programs include instructions for transmitting information identifying the electronic device to the trust broker system. The one or more programs include instructions for receiving, from the trust broker, information that enables the client device to connect to a server system, wherein the trust broker determines the appropriate server system based on the client device. The one or more programs include instructions for downloading, from the server system, further instructions for performing the one or more tasks associated with the client device; wherein the downloaded instructions are only retained for the current session.

In accordance with some implementations, a non-transitory computer readable storage medium storing one or more programs configured for execution by a client device is disclosed. The one or more programs also include instructions for connecting to a trust broker system upon start-up of the device, wherein the device is not enabled to connect to any other system. The one or more programs include instructions for transmitting information identifying the electronic device to the trust broker system. The one or more programs include instructions for receiving, from the trust broker, information that enables the client device to connect to a server system, wherein the trust broker determines the appropriate server system based on the client device. The one or more programs include instructions for downloading, from the server system, further instructions for performing the one or more tasks associated with the client device; wherein the downloaded instructions are only retained for the current session.

In accordance with some implementations, a method for connecting to a trust broker system is disclosed. The method is performed on an electronic device having one or more processors and memory storing one or more programs for execution by the one or more processors. The electronic device stores encrypted identifying information for a plurality of client systems authorized to interact with the server system, wherein the encrypted identifying information is changed per client system per session. The electronic device creates a plurality of virtual domains; each virtual domain representing a set of services and information distinct from the other virtual domains. The electronic device stores permissions associated with each respective client system in the plurality of client system; wherein the stored permissions indicate the virtual domains accessible to the respective client systems. The electronic device receives a request from a first client system, including encrypted identifying information associated with the first client system, for information associated with a first virtual domain. The electronic device then retrieves stored permissions of the first client system based on the encrypted identifying information. The electronic device determines, based on the stored permissions associated with the first client system, whether the first client system is permitted to access the requested first virtual domain.

In accordance with some implementations, an electronic device for connecting to a trust broker system is disclosed. The electronic device has one or more processors and memory storing one or more programs to be executed by the one or more processors. The one or more programs include instructions for storing encrypted identifying information for a plurality of client systems authorized to interact with the server system, wherein the encrypted identifying information is changed per client system per session. The one or more programs include instructions for creating a plurality of virtual domains; each virtual domain representing a set of services and information distinct from the other virtual domains. The one or more programs include instructions for storing permissions associated with each respective client system in the plurality of client system; wherein the stored permissions indicate the virtual domains accessible to the respective client systems. The one or more programs include instructions for receiving a request from a first client system, including encrypted identifying information associated with the first client system, for information associated with a first virtual domain. The one or more programs include instructions for retrieving stored permissions of the first client system based on the encrypted identifying information. The one or more programs include instructions for determining, based on the stored permissions associated with the first client system, whether the first client system is permitted to access the requested first virtual domain.

In accordance with some implementations, a non-transitory computer readable storage medium storing one or more programs configured for execution by an electronic device is disclosed. The one or more programs also include instructions for storing encrypted identifying information for a plurality of client systems authorized to interact with the server system, wherein the encrypted identifying information is changed per client system per session. The one or more programs include instructions for creating a plurality of virtual domains; each virtual domain representing a set of services and information distinct from the other virtual domains. The one or more programs include instructions for storing permissions associated with each respective client system in the plurality of client system; wherein the stored permissions indicate the virtual domains accessible to the respective client systems. The one or more programs include instructions for receiving a request from a first client system, including encrypted identifying information associated with the first client system, for information associated with a first virtual domain. The one or more programs include instructions for retrieving stored permissions of the first client system based on the encrypted identifying information. The one or more programs include instructions for determining, based on the stored permissions associated with the first client system, whether the first client system is permitted to access the requested first virtual domain.

In accordance with some implementations, a method for securing communication over a network is disclosed. The method is performed on a trust broker system having one or more processors and memory storing one or more programs for execution by the one or more processors. The trust broker system receives a request to connect to applications and resources from a client system. The trust broker system determines whether the client system is authorized to connect to the requested applications and resources. In response to determining the client system has authorization to connect to the requested applications and resources, the trust broker system determines, from a plurality of potential proxy servers, a proxy server associated with the requested server system and transmits an identification value for the client system to the requested server system. The trust broker system then transmits the identification value to the client system and transmits contact information for the determined proxy server to the client system, wherein all communication between the client system and the requested server system passes through the proxy server.

In accordance with some implementations, a trust broker system validating a client system is disclosed. The trust broker system has one or more processors and memory storing one or more programs to be executed by the one or more processors. The one or more programs include instructions for receiving a request to connect to applications and resources from a client system. The one or more programs include instructions for determining whether the client system is authorized to connect to the requested applications and resources. The one or more programs include instructions for, in response to determining the client system has authorization to connect to the requested applications and resources determining, from a plurality of potential proxy servers, a proxy server associated with the requested server system and transmits an identification value for the client system to the requested server system. The one or more programs include instructions for transmitting the identification value to the client system and transmitting contact information for the determined proxy server to the client system, wherein all communication between the client system and the requested server system passes through the proxy server.

In accordance with some implementations, a non-transitory computer readable storage medium storing one or more programs configured for execution by a trust broker system is disclosed. The one or more programs also include instructions for determining whether the client system is authorized to connect to the requested applications and resources. The one or more programs include instructions for, in response to determining the client system has authorization to connect to the requested applications and resources determining, from a plurality of potential proxy servers, a proxy server associated with the requested server system and transmits an identification value for the client system to the requested server system. The one or more programs include instructions for transmitting the identification value to the client system and transmitting contact information for the determined proxy server to the client system, wherein all communication between the client system and the requested server system passes through the proxy server.

BRIEF DESCRIPTION OF THE DRAWINGS

Like reference numerals refer to corresponding parts throughout the drawings.

DESCRIPTION OF IMPLEMENTATIONS

Systems are described herein for improving the security of network assets and network communications performed over the Internet or any other public computer network. In some implementations, the network in question is a corporate network for a large organization with diverse operations—sometimes in multiple countries—and a host of employees who perform a variety of different roles in the organization and who need to access the organization's network—sometimes using a variety of client devices. Securing corporate networks is particularly important because organizations with sensitive information are at risk from malicious attacks that target networked assets (e.g. servers accessible over public computer networks, such as the Internet, or data stored in a network) or target actual communications that are transmitted over the publically accessible network.

In some implementations, a system for securing network assets and network communications provides dynamic access control, server invisibility, application/system health checks, and automatic end-to-end security for applications. In some implementations, the network security system does not require or depend on particular applications or client or server platforms. Thus, the system is flexible enough to be used by a variety of organizations with different operating systems and hardware.

Figure 1:
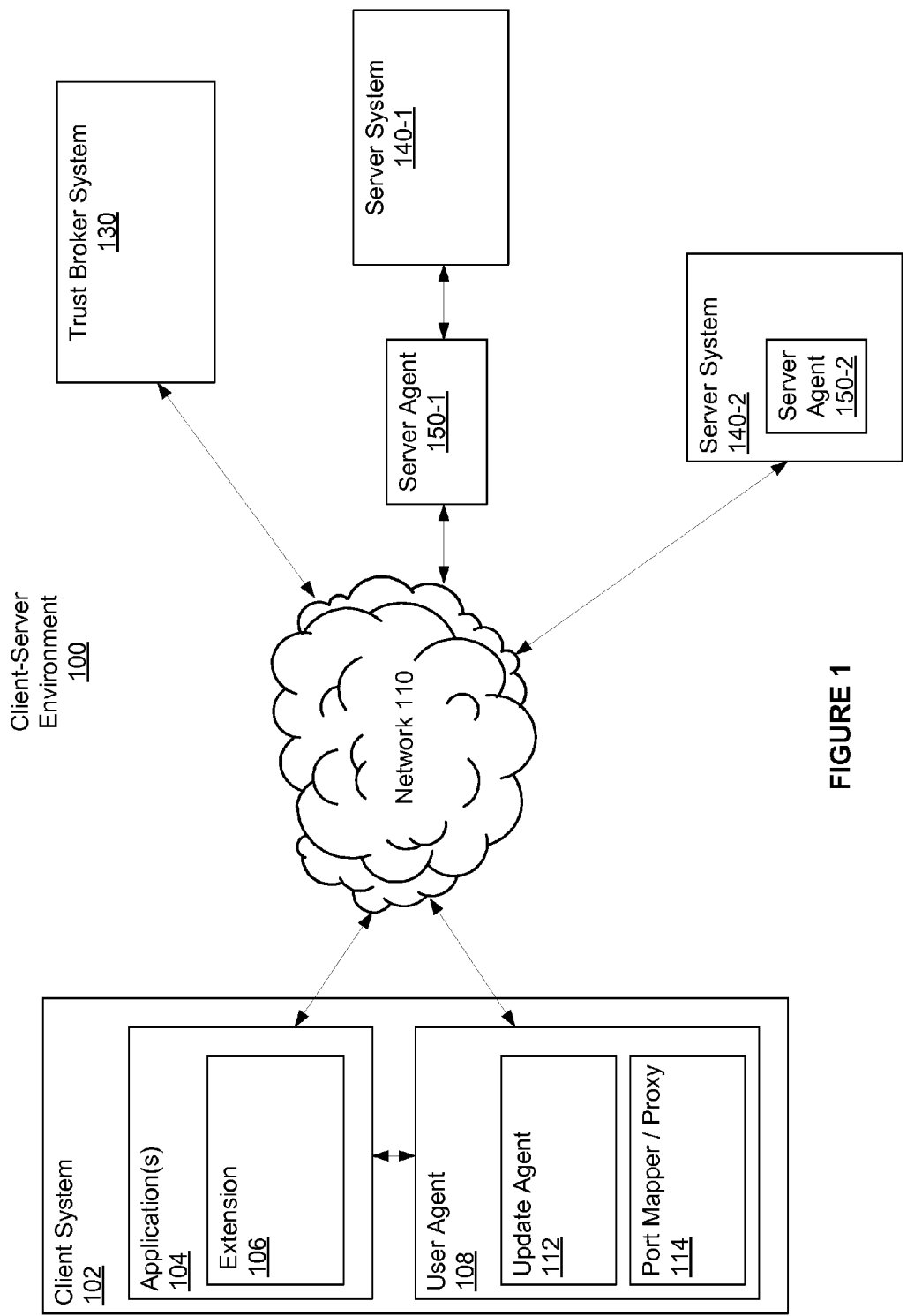
FIG. 1 is a block diagram illustrating a client-server environment in accordance with some implementations.

FIG. 1 is a block diagram illustrating a client-server environment 100 in accordance with some implementations. The client-server environment 100 includes a client system 102 and a remote system for securing organizational assets and communications over a network that includes a trust broker system 130, one or more server agents 150, and one or more server systems 140-1 and 140-2, all connected over a network 110. In some implementations, the client system 102 includes one or more client applications 104 and a user agent 108. The network 110 may be any of a variety of networks, including local area networks (LAN), wide area networks (WAN), wireless networks, wired networks, the Internet, or a combination of such networks.

In accordance with some implementations, the client server environment 100 also includes one or more client systems 102, such as laptop computers, smart phones, tablets and desktop computers. In some implementations, the client system 102 includes one or more client applications 104 and a user agent 108. The one or more client applications 104 include, but are not limited to, a web browsing application for connecting to the server system 140. When the client system 102 wishes to access the information stored at a server system 140 or the service provided by a server system 140, the client system 102 must first install/initialize a trusted user agent application 108.

In some implementations, the user agent 108 is an application that executes on a client system 102 and that allows the client system 102 to establish a secure connection with the trust broker system 130. Once a secure connection has been established with the trust broker system 130, the client system 102 is able to request data or services from the trust broker system 130. In some implementations, the user agent 108 is an extension 106 of a web browsing application 104. For example, the user agent 108 can be installed as a third party add-on or plug-in for common web browsing applications, such as Chrome, Firefox, or Internet Explorer. In some implementations, the web browser 104 is custom developed to natively include the capabilities of the user agent 108 without the use of extensions. In such an implementation, the customized web browser 104 would be used without an independent user agent 108 application. In some implementations, the user agent incorporated into and application (App) on a mobile phone.

In some implementations, the client system 102 launches the user agent 108 when the client system needs to interact with the trust broker system 130. In some implementations, the user agent 108 is responsible for initiating the user authentication process via the trust broker system 130. In some implementations, the trust broker system 130 is responsible for ensuring that only trusted client systems and/or users are permitted to access the secure server system 140. In some implementations, the user agent 108 performs a system safety check on the client system 102. In some implementations, the user agent 108 scans the system for malicious software and verifies the identity of the client system by retrieving a digital certificate or system finger print from the client system 102 and then comparing the received digital certificate or system fingerprint with previously received digital certificate or system fingerprints. In this way the trust broker system 130 can identify the specific client system 102 and determine whether the software on the client system has changed.

In some implementations, the user agent 108 has an auto self-update capability for automatically updating software used to access the server system 140 based on instructions received from the server system 140 via the trust broker system 130. For example, the user agent 108 checks with the trust broker system 130 to determine whether there are any updates to the malicious code scanning software prior to scanning the client system 102 for potentially malicious code. Once the malicious code scanning software has been updated to the most current version, the user agent 108 does a virus scan and determines if any viruses or other malicious code are currently active on the client system 102.

In some implementations, the trust broker system 130 is primarily responsible for ensuring the security of the client system 102 and verifying the identity of the user. In this case the user agent 108 is primarily responsible for retrieving information requested by the trust broker system 130. For example, in concert with the user agent 108, the trust broker system 130 determines the integrity and health of the client system prior to allowing the user agent to establish connections with the server system.

In some implementations, the user agent 108 determines that the client system 102 is found to be unsafe or fails to verify the identity of the client system 102 or the user of the client system 102. In accordance with this determination, the user agent displays a message to the user and ceases further validation attempts without contacting the trust broker system 130. In some implementations, the message includes a brief explanation describing why the system safety check failed such as an error code or a text description.

In some implementations, the user agent 108 determines that the client system 102 is determined to be safe but must still verify that a particular user is authorized to use the client system 102. The user's identity can be established through a variety of methods. For example, in some implementations, the user agent 108 verifies a user's identity by requesting user credentials (such as username/password, USB token, RSA token number, or any other secure identification method). In some implementations, once the user's identity has been established the user agent must determine whether the identified user is authorized to user the specific client system 102 on which the user agent 108 is operating. In some implementations, each client system 102 is assigned to one or more specific users and thus only the assigned users will be authorized by the user agent 108. In some implementations the user agent 108 compares the received user credentials against a list of authorized users stored on the client system 102 itself. In other implementations, the user agent 108 transmits the user credentials to the trust broker system 130 for verification.

In some implementations, the user agent 108 then requests a secure connection with the trust broker system 130. Once the trust broker system 130 verifies the client system 102 (see discussion below), the trust broker system 130 established a secure connection with the user agent 108. In some implementations, the application 104 on the client system 102 requests data or services associated with the trust broker system 130. In response the user agent 108 receives tailored information from the trust broker system 130. The information received from the trust broker system 130 includes session keys (for encrypting communications), the network address of a proxy server with a server agent 150 or of the server system 140 itself, port numbers, and encrypted client identification code to identify the client system 102 to a server agent 130 associated with the information or service requested by the client system 102. In some implementations, the user agent 108 receives the network address of the server agent 150 associated with the requested data or service.

In some implementations, the client system 102 receives information necessary to install needed applications and system configuration information. For example, some client systems 102 do not permanently store applications or information necessary to perform certain functions and instead download the necessary data from a server system 140 as needed. In some implementations, the client system 102 determines whether one or more important applications are up to date. If the client system 102 determines that the one or more applications have not been updated to the most recent approved version of the one or more applications, the client system 102 receives information necessary to update the applications from the trust broker system 130.

In some implementations, the client system 102 uses the user agent 108 to secure a connection with a server agent 130 to receive the requested data or service. The user agent 108 receives the requested data or service in an encrypted communication session. In some implementations, the encryption key used to encrypt communications is periodically changed.

In some implementations, the user agent 108 includes an update agent 112 and a port mapper or proxy 114. The update agent 112 determines whether applications on the client system 102 are the most recent approved version and, if not, receiving the information necessary to update the relevant applications. The port mapper or proxy 114 is used to route application data to the appropriate server system 140, such as an application server.

In some implementations, the system for improving the security of organization assets and communication on a computer network 110 is important because organizations with sensitive information are at risk from malicious attacks that target networked assets (e.g. servers accessible over public computer networks 110, such as the Internet) or actual communications that are transmitted over the publically accessible network 110. In some implementations, the system for improving the security of organization assets and communication on a computer network 110 provides dynamic access control, server invisibility, application/system health checks, and automatic end-to-end security for applications. In some implementations, the system does not require or depend on particular applications or client or server platforms. Thus, the system is flexible enough to be used by a variety of organizations with different operating systems and hardware.

In some implementations, a trust broker system 130 manages the entire secure communication network and the interactions between client systems 102 and the server systems 140. This process begins when the trust broker system 130 receives a connection request from a user agent 108. The trust broker system 130 first verifies the identity of the client system 102. Verifying the client system 102 includes receiving information identifying the client system 108 on which the user agent 108 is executing. For example, in some implementations the trust broker system 130 receives the IP address of the client system 102, the MAC address of the client system 102, a value uniquely associated with the computer (such as a encrypted name value), serial number of the computer, software/hardware finger print, encrypted message from a TPM (Trusted Platform Module) or any other uniquely identifying value.

In some implementations, the trust broker system 130 validates the integrity of the client system 102. The trust broker system 130 receives a generated system fingerprint for the client system 102. In some implementations, the trust broker system 130 receives a fingerprint from a trusted processor module (TPM) chip on the client system 120. The generated system fingerprint contains information describing the applications installed on the client system 102. For example, the client system 102 creates a hash value of the list of applications installed on the client system. The trust broker system 130 then looks up the hash value on a stored list of approved or authorized client systems 102. If the hash value matches a value in the stored list of approved client systems 102, the integrity of the client system 102 is confirmed.

In some implementations, the trust broker system 130 further verifies the integrity of the client system 102 by determining whether any new software has been installed on the client system 102 since the last time the system was validated. This can be done using one or more techniques. For example, in some implementations, the system fingerprint is checked to determine if it has changed since the last connection. If new software has been installed, the trust broker system 130 causes the client system 102 to be scanned for malicious software. In some implementations, the trust broker system 130 transmits instructions for scanning to the client system 130 and conducts the scan remotely. In other implementations, the client system 102 conducts the scan and reports the results to the trust broker system 130. In yet other implementations, the trust broker system 130 determines whether the scanning software on the client system 120 is up to date, and if so, determines that the client system 102 is secure.

In some implementations, the trust broker system 130 determines the physical location of the client system 102. For example, in some implementations, the trust broker system 130 estimates the location of the client system 102 from the IP address associated with the client system 102, which is generally correlated with the location from which the device is accessing the Internet. In accordance with some implementations, the trust broker system 130 determines the location of the client system 102 by accessing a GPS device associated with the client system 102. Once the physical location of the client system 102 is determined, the trust broker system 130 retrieves a list of authorized regions within which the specific client system 102 is authorized to operate. For example, some client devices 102 are only authorized to be used in a specific city, state, or country. Other client devices are only authorized to be used in a specific building. If the client system 102 is determined to be within an authorized region, the trust broker system 130 allows the secure connection to continue. If not, the connection is terminated and a message is sent to the client system 102 explaining the reason for the disconnection. For example, if a client system 102 is authorized to be use in Atlanta, Ga. and its suburbs, but the trust broker system 130 determines the client system 102 is requesting a connection from Paris, France, the trust broker system 130 would then determine terminate the connection.

In some implementations, the trust broker system 130 also verifies the identity of the user of the client system 102. This can be accomplished by any acceptable technique. For example, in some implementations, the trust broker system 130 receives an identifier (such as a password) associated with the user. In some implementations, the identifier is a random number that is used for only one communication session. In some implementations, the identifier is a name or password associated with the user that has been encrypted. The encryption is done using a key that is changed with each communication session, thus ensuring that the identifier changes for each communication session. The trust broker system 130 then uses the identifier to identify the identity of the user of the client system 102 by cross referencing the received identifier against a list of authorized users and their associated identifiers. Once the identity of the user is established, the trust broker system 130 is able to determine whether the user is authorized to interact with the trust broker system 130.

In some implementations, once the trust broker system 130 verifies the integrity and identity of the client system 102 and its user, the trust broker system 130 establishes a secure communication session with the user agent 108 at the client system 102. As noted above, the communication session is encrypted. In some implementations, once the secure communication session has been established with the user agent 108, the trust broker system 130 provides the user agent with a list of applications and services that it is allowed to access; e.g., access to a specific file or corporate email.

In some implementations, when a request for data or services is received, the trust broker system 130 determines what network resources the client device 102 is authorized to request. The trust broker system 130 makes this determination by accessing a database that stores the permission levels associated with each user or client system 102. In some implementation, access to system resources is controlled by dividing various resources into a plurality of virtual domains. Virtual domains are logical, not physical, groupings of related network data and resources to which some users have access to and others do not. In some implementations, the role of a user or a client system 102 determines which virtual domains they are permitted to access.

In some implementations, the trust broker system 130 maintains an access database of client systems 102, users, and the virtual domains they are authorized to access. For example, in a corporation a programmer would be allowed to access information and resources related to writing and maintaining the code base, but not information and resources related to administrating the human resources department. Thus, the access database would list the programmer as having access to the programming virtual domain but not the human resources administration virtual domain. Thus, in some implementations, when the trust broker system 130 receives a request from a user or a client device 102 for particular data or services, locates the virtual domain that contains the requested information or services and then looks the user up in the access database to determine whether the requesting user or client system 102 is authorized to access that virtual domain.

In some implementations, the trust broker facilitates a "need to know" information model by maintaining a mapping of users, roles and resources. In larger organizations, the trust broker system 130 can also query Identity and Access Management databases (like Oracle) to determine what resources a user is allowed to access based on their role in the company.

In some implementations, in accordance with a determination that the requested clients system 102 or user is authorized to access the requested information or service, the trust broker system 130 determines the server system 140 from the plurality of server systems 140 that contains the information or services requested by the client system 102. Once the trust broker system 130 determines the specific system 140, the trust broker system then determines an associated server agent 150. In some implementations one specific server agent 150 is always associated with a specific server system 140. In other implementations, the specific server agent 150 associated with a particular server system 140 is not fixed and instead the trust broker system 130 chooses a server agent 150 from a plurality of server agents 150 to act as a proxy for the particular server system 140. By changing the server agent 150 that acts as proxy for a given server system 140, the trust broker system 130 ensures that an attacker cannot reliably know which server agent 150 is currently acting as a proxy for the desired server system 140.

In some implementations, the trust broker server 130 assigns an authenticated client system 102 a specific identifier. In some implementations, the identifier is a random value. In other implementations, the identifier is a name or password associated with the client system 102. As noted above, the identifier is changed for each communication session. The trust broker server 130 transmits the encrypted name to the determined server agent 150. The trust broker server 130 also transmits the network address of the determined server agent 150 to the requesting client system 102 via the user agent 108. The client system 102 then initiates an encrypted communication session with a server system 140 via the server agent 150.

In some implementations, the server agent 150-1 is a proxy server distinct from the server system 140. The server agent 150 includes a list of encrypted identifiers validated by the trust broker system 130. In some implementations, when the server agent 150 receives a packet from a client system 102 requesting a communication session the server agent 150 determines whether the packet includes a encrypted identifier and if so, whether the encrypted identifier is among the list of encrypted identifiers validated by the trust broker system 130. In accordance with a determination that the packet either does not include an encrypted identifier or, if it does, that the encrypted identifier is not among the list of authorized client systems 102, the server agent 150 immediately drops the packet, without responding to the system that was the source of the packet. By only responding to packets that include a pre-approved encrypted identifier, the server agent 150 is able to efficiently filter out non-authorized connection attempts and therefore avoid being compromised by certain malicious attacks (such as a distributed denial of service attack (DDOS)).

In some implementations, when the server agent 150 determines that initial packet includes an encrypted identifier that corresponds to an authorized client system 102, the server agent 150 opens a secure communication session with the client system 102 and acts as proxy between the client system 102 and the server system 140.

In some implementations, the server agent 150-2 is an application running on the server system 140-2. The server agent 150-2 in this case manages communications between the server system 140-2 and the trust broker system 130, as well as any communications between the server system 140-2 and a user agent 108 at a client system 102. Please note that any communication between the client system 102 and the trust broker system 130, a server agent 150, or a server system 140 may also be conducted via the user agent 108. Similarly a communication between the server system 140 and a client system or the trust broker system 130 may be conducted via a server agent 150.

In some implementations, one or more server systems 140 store data (for example, the work product of attorneys) and provide services (for example an email service or a document backup service) that are accessible over a network. In some implementations, the communication with authorized user agents 108 is conducted through a proxy, such as a server agent 108. In other implementations, the server system 140 communicates with an authorized client system 102 directly through secure communication sessions.

Figure 2:
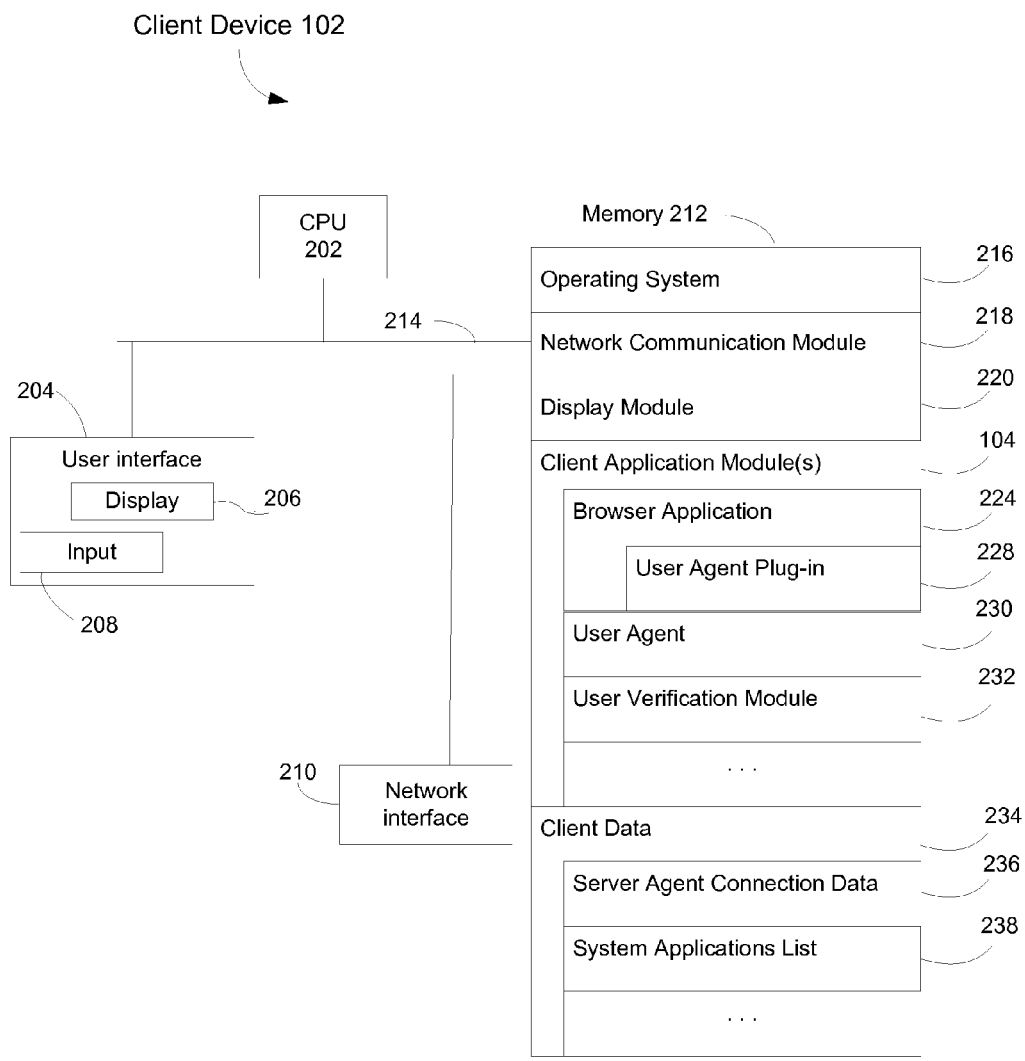
FIG. 2 is a block diagram illustrating a client system, in accordance with some implementations.

FIG. 2 is a block diagram illustrating a client system 102, in accordance with some implementations. The client system 102 typically includes one or more processing units (CPU's) 202, one or more network interfaces 210, memory 212, and one or more communication buses 214 for interconnecting these components. The client system 102 includes a user interface 204. The user interface 204 includes an associated display device 104 and optionally includes an input means such as a keyboard, mouse, a touch sensitive display, or other input buttons 208. Optionally, the display device 206 includes an audio device or other information delivery device. Furthermore, some client systems use a microphone and voice recognition to supplement or replace the keyboard.

Memory 212 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately the non-volatile memory device(s) within memory 212, includes a non-transitory computer readable storage medium. In some implementations, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other wide area networks, local area networks, metropolitan area networks, and so on;
- a display module 220 for enabling display of content on a display 206 associated with the client system 102;
- one or more client system 102 applications module(s) 104 for enabling the client system 102 to perform the functions offered by the client system 102, including but not limited to:
  - a browser application 224 for sending requests to a trust broker system (FIG. 1, 130) and displaying the information (for example web pages) returned by a server system (FIG. 1, 140), the browser application including:
    - a user agent plug-in 228 that enhances the capabilities of the browser application 224 to enable it perform the tasks of a user agent 230, such as verifying the browser has not been tampered with, verifying the health of the client device 102, managing a secure connection with the trust broker system (FIG. 1, 130), and forwarding requests from a client application module to the appropriate server agent (FIG. 1, 150);
  - a user agent module 230 for verifying the health of the client device 102, managing a secure connection with the trust broker system (FIG. 1, 130), and forwarding requests from a client application module to the appropriate server agent (FIG. 1, 150);
  - a user verification module 232 for verifying the identity of the user of the client system 102 by, for example, requesting a password and user identification data; and
  - a client data module 234 for storing data related to the client system 102, including but not limited to:
    - server agent connection data 236, including data necessary to connect to a server agent (FIG. 1, 150) needed to obtain requested data or services, including but not limited to the network address for the server agent (FIG. 1, 150) and a encrypted client identifier to identify the client system 102 to the server agent (FIG. 1, 150); and
    - system application list 238 including data corresponding to the applications currently installed in the client device 102 and a system fingerprint representing the list of installed applications.

Figure 3:
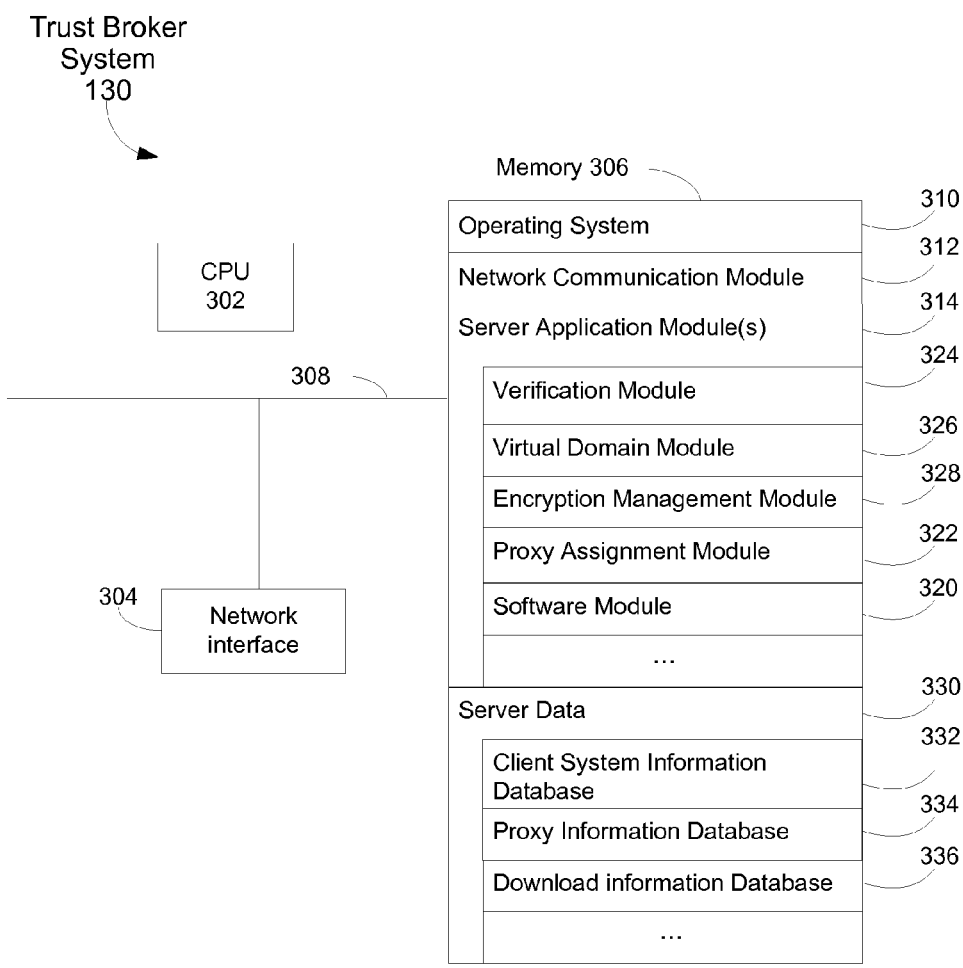
FIG. 3 is a block diagram illustrating a trust broker system, in accordance with some implementations.

FIG. 3 is a block diagram illustrating a trust broker system 130, in accordance with some implementations. The trust broker system 130 typically includes one or more processing units (CPU's) 302, one or more network interfaces 304, memory 306, and one or more communication buses 308 for interconnecting these components.

Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302. Memory 306, or alternately the non-volatile memory device(s) within memory 306, includes a non-transitory computer readable storage medium. In some implementations, memory 306 or the computer readable storage medium of memory 306 stores the following programs, modules and data structures, or a subset thereof:

- an operating system 310 that includes procedures for handling various basic system services and for performing hardware dependent tasks;
- a network communication module 312 that is used for connecting the trust broker system 130 to other computers via the one or more communication network interfaces 304 (wired or wireless) and one or more communication networks, such as the Internet, other wide area networks, local area networks, metropolitan area networks, and so on;
- one or more server application module(s) 314 for enabling the trust broker system 130 to perform the functions offered by the trust broker system 130, including but not limited to:
  - a verification module 324 for verifying the integrity and identity of client systems (FIG. 1, 102), attempting to connect to the trust broker system 130, and determining whether the client system is physically located in an approved geographic location;
  - a virtual domain module 326 for determining what network resources are available to which client systems (and users of those client systems) based on criteria, including but not limited to the role of the user of the client system, the location of the client system (FIG. 1, 102), and the integrity of the client system (FIG. 1, 102);
  - a encryption management module 328 for creating and distributing per session encryption keys (PSKs) used to established secure communication sessions and for establishing encrypted identifiers or names that client systems (FIG. 1, 102) use to authenticate themselves to the server agent (FIG. 1, 150);
  - a proxy assignment module 322 for determining out of a plurality of potential proxy systems a particular system associated with a given server system (FIG. 1, 140) and in some implementations, periodically changing the proxy system associated with a particular server system (FIG. 1, 140)
  - a software module 320 to verify the identity or role of a user, the integrity of a client system by querying an external system such as an identity data base or multi factor authentication server; and
- one or more server data module(s) 330 for storing data related to the trust broker system 130, including but not limited to:

client system information database 332 for including data for determining whether a particular client system (FIG. 1, 102): is authorized to connect to the system, has not been altered via a system fingerprint, is being used by an approved user, and is within predetermined geographical boundaries;

proxy information database 334 including data describing the proxy servers available to the trust broker system 130 and to which server systems (FIG. 1, 140) a particular proxy server is associated; and download information database 336 including information describing which applications need to be installed on particular client systems (FIG. 1, 102) especially for zero state systems where all necessary data and application software needs to be downloaded each time it comes online.

Figure 4:
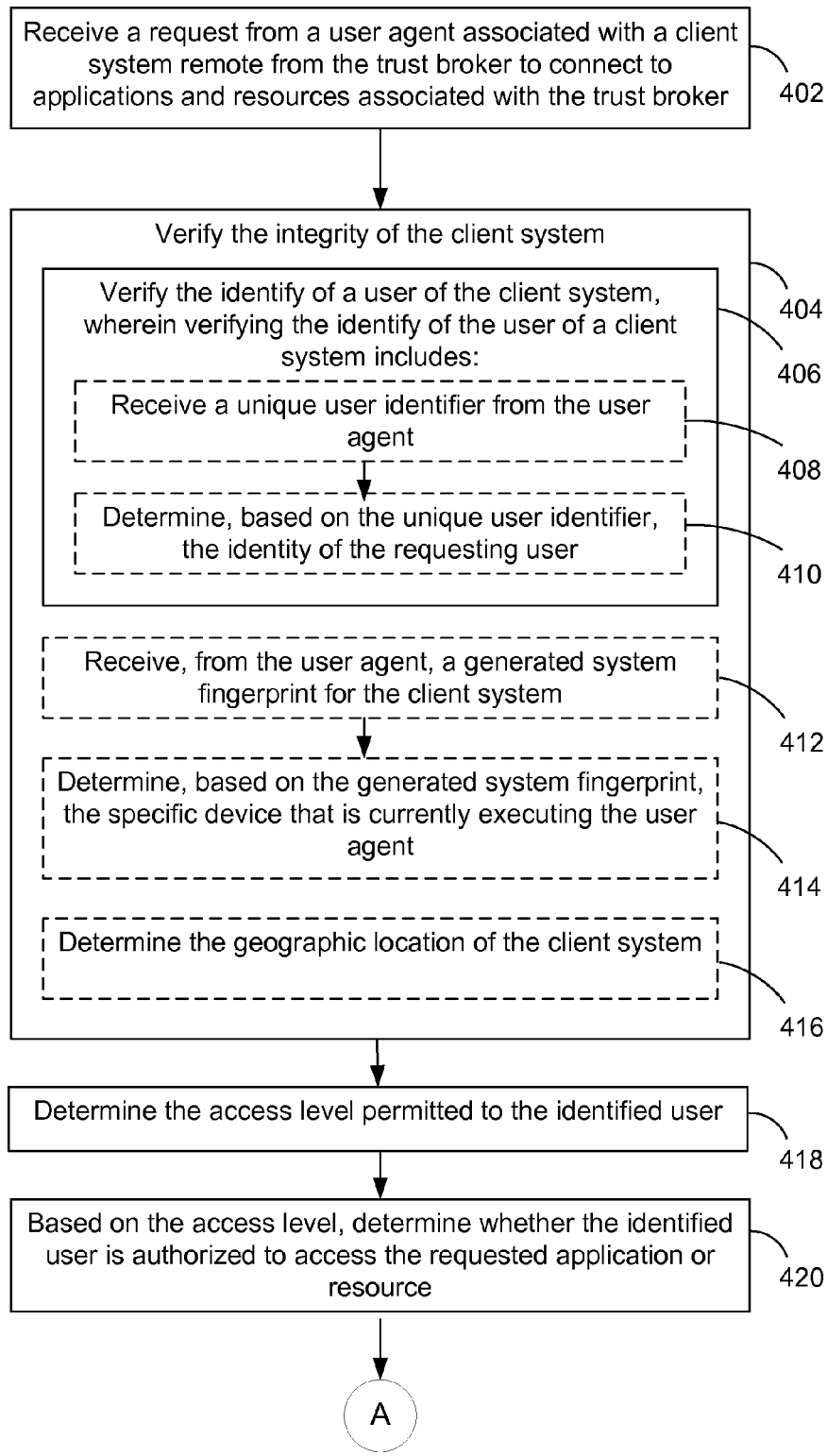
FIG. 4 is a flow diagram illustrating the process for storing levels of trust between users for use in accordance with some implementations.

FIG. 4 is a flow diagram illustrating the process for storing levels of trust between users for use in accordance with some implementations. Each of the operations shown in FIG. 4 may correspond to instructions stored in a computer memory or computer readable storage medium. Optional operations are indicated by dashed lines (e.g., boxes with dashed-line borders). In some implementations, the method described in FIG. 4 is performed by the trust broker system (FIG. 1, 130).

In accordance with some implementations, the trust broker system (FIG. 1, 130) receives a request from a user agent associated with a client system remote from the trust broker to connect with applications and resources associated with the trust broker (402). In response to the request to connect with a server system (FIG. 1, 140), the trust broker system (FIG. 1, 130) verifies the integrity of the client system (FIG. 1, 102) (404). This can be accomplished in many ways. For example, the trust broker system (FIG. 1, 130) scans or causes the user agent (FIG. 1, 108) to scan the client system (FIG. 1, 102) for malicious software.

In some implementations, verifying the integrity of the client system (FIG. 1, 102) includes verifying the identity of a user of the client system (406). The trust broker system (FIG. 1, 130) receives a unique user identifier from the user agent (408) such as a user id and password. The trust broker system (FIG. 1, 130) determines, based on the unique user identifier, the identity of the requesting user (410). For example, the trust broker system includes a database matching users of the system with their respective user identifiers. By looking up the received user identifier in the database, the trust broker system 130 can determine the identity of the user.

In some implementations, the trust broker system (FIG. 1, 130) receives, from the user agent, a generated system fingerprint for the client system (FIG. 1, 102) (412). The trust broker system (FIG. 1, 102) determines, based on the generated system fingerprint, the specific device that is currently executing the user agent (FIG. 1, 108) (414). In some implementations, the trust broker system (FIG. 1, 130) determines the geographic location of the client system (FIG. 1, 102) (416).

In some implementations, the trust broker system (FIG. 1, 130) determines the access level permitted to the identified user (418). Based on the access level of the user, the trust broker system (FIG. 1, 130) determines whether the identified user is authorized to receive the requested material. (420)

Figure 5:
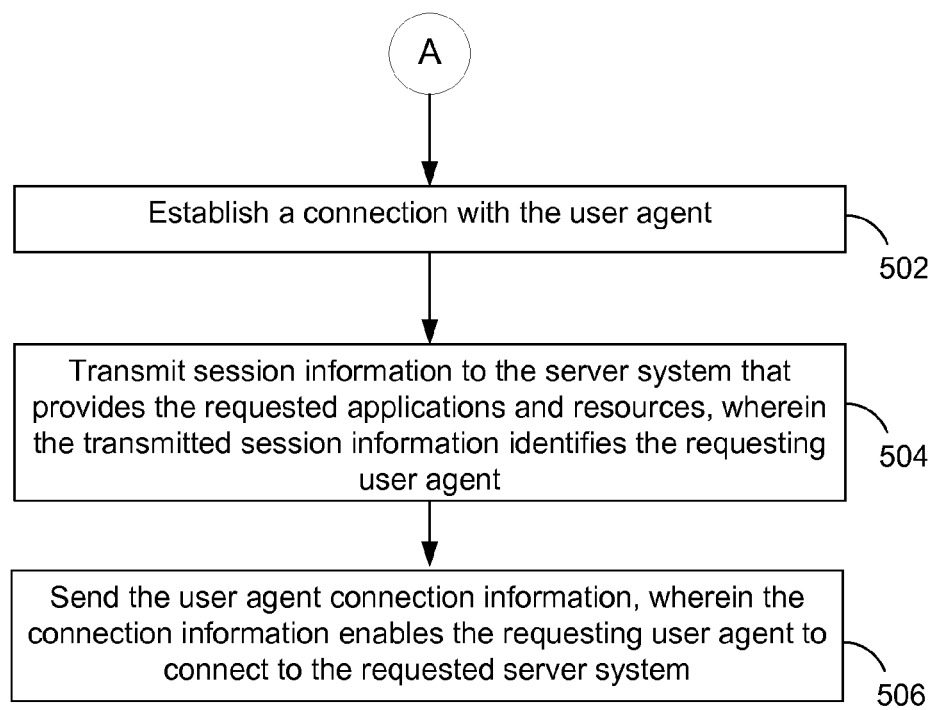
FIG. 5 is a flow diagram illustrating a process for securing communication over a network in accordance with some implementations.

FIG. 5 is a flow diagram illustrating a process for securing communication over a network in accordance with some implementations. Each of the operations shown in FIG. 5 may correspond to instructions stored in a computer memory or computer readable storage medium. Optional operations are indicated by dashed lines (e.g., boxes with dashed-line borders). In some implementations, the method described in FIG. 5 is performed by the trust broker system (FIG. 1, 130).

In some implementations, the trust broker system (FIG. 1, 130) establishes a connection with the user agent (FIG. 1, 150) (502). In some implementations, the trust broker system (FIG. 1, 130) transmits session information to the server system (FIG. 1, 140) that provides the requested applications and resources, wherein the transmitted session information identifies the requesting user agent (FIG. 1, 108) (504). The server system (FIG. 1, 140) then uses the transmitted session information to evaluate client systems (FIG. 1, 102) requesting connection with the server system (FIG. 1, 140). For example, a request to connect is received by the server system (FIG. 1, 140), the server system 140 can use the transmitted session information to determine whether the request is from a legitimate source.

In some implementations, the trust broker system (FIG. 1, 130) sends the user agent connection information, wherein the connection information enables the requesting user agent to connect to the requested server system (FIG. 1, 140) (506). The connection information includes a network address for a server system (FIG. 1, 140) (or a proxy for the server system (FIG. 1, 140) and an encrypted identifier to identify the client system (FIG. 1, 130) to the server system (FIG. 1, 140).

Figure 6:
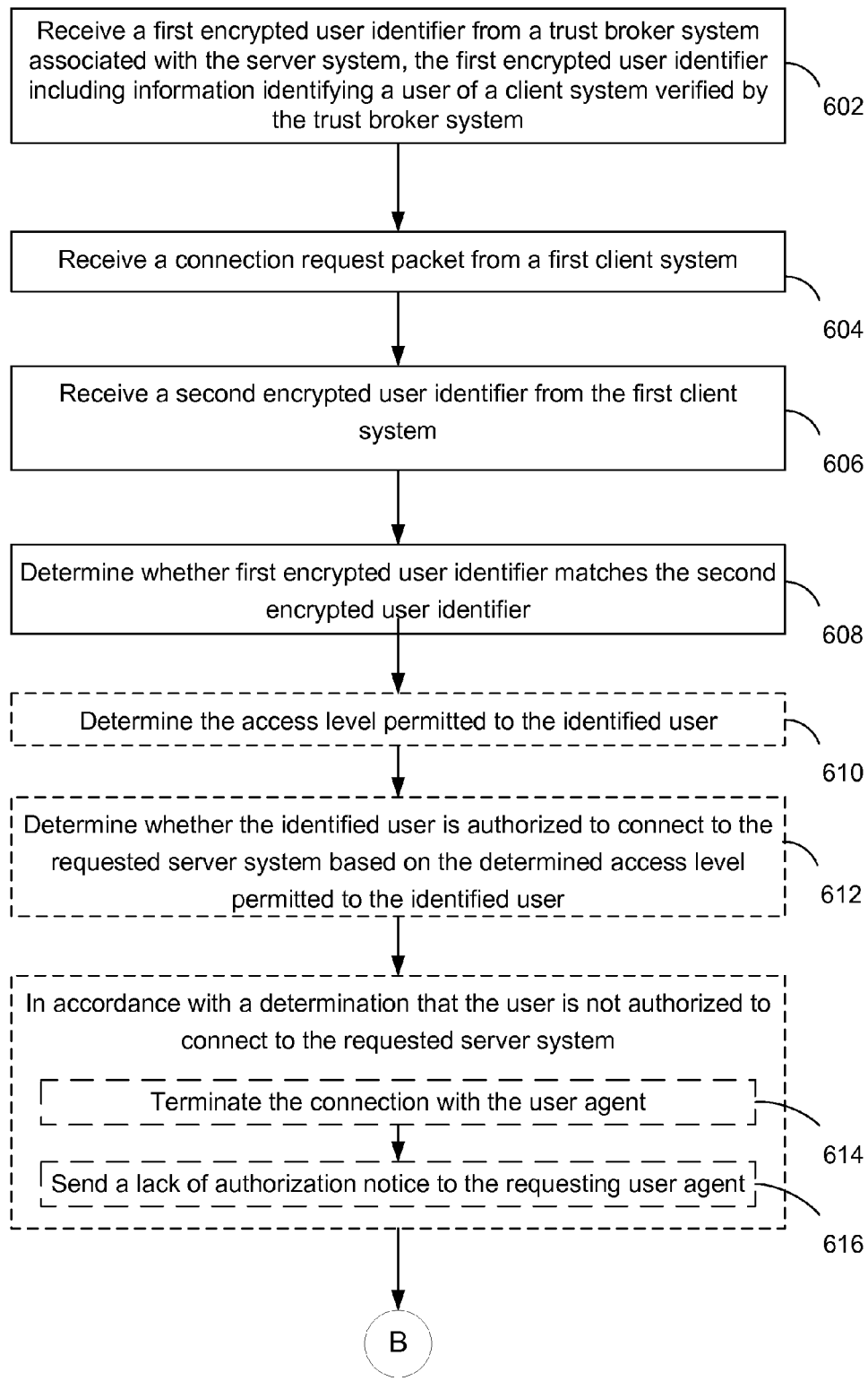
FIG. 6 is a flow diagram illustrating a process for securing communication over a network in accordance with some implementations.

FIG. 6 is a flow diagram illustrating a process for securing communication over a network in accordance with some implementations. Each of the operations shown in FIG. 6 may correspond to instructions stored in a computer memory or computer readable storage medium. Optional operations are indicated by dashed lines (e.g., boxes with dashed-line borders). In some implementations, the method described in FIG. 6 is performed by the server system (FIG. 1, 140).

In some implementations, the server system (FIG. 1, 140) receiving a first encrypted user identifier from a trust broker system (FIG. 1, 150) associated with the server system (FIG. 1, 140), the first encrypted user identifier including information identifying a user of a client system (FIG. 1, 102) verified by the trust broker system (FIG. 1, 150) (602). In some implementations the encrypted user identifier is a random number assigned to the client system (FIG. 1, 102) for a single communication session and is thus the equivalent of an encrypted value. The server system receives a connection request from a first client system (FIG. 1, 102) (604)

In some implementations, the server system (FIG. 1, 140) receives a second encrypted user identifier from the first client system (FIG. 1, 102) (606). In some implementations, the encrypted user identifier is included with the connection request, as a single communication packet. In some implementations, the server system (FIG. 1, 140) determines whether the first encrypted user identifier matches the second encrypted user identifier (608). In some cases, the server system (FIG. 1, 140) has a white list of a plurality of client systems authorized to request information and services from the server system (FIG. 1, 140). In some implementations, the trust broker system (FIG. 1, 140) notifies the server system when a particular encrypted user identifier is no longer valid. In other implementations, all encrypted user identifiers automatically expire after a predetermined amount of time.

In some implementations, the server system (FIG. 1, 140) determines the access level permitted to the identified user (610). In some implementations, this determination is done in accordance with the role of the client system (FIG. 1, 102)

or the role of the user associated with the client system (FIG. 1, 102). The server system (FIG. 1, 120) then determines whether the identified user is authorized to connect to the requested server system (FIG. 1, 140) based on the determined access level permitted to the identified user (612).

In some implementations, in accordance with a determination that the user is not authorized to connect to the requested server system (FIG. 1, 140), the server system (FIG. 1, 140) terminates the connection with the user agent (FIG. 1, 108) (614). The server system (FIG. 1, 140) then sends a lack of authorization notice to the requesting user agent (FIG. 1, 108) (616).

Figure 7:
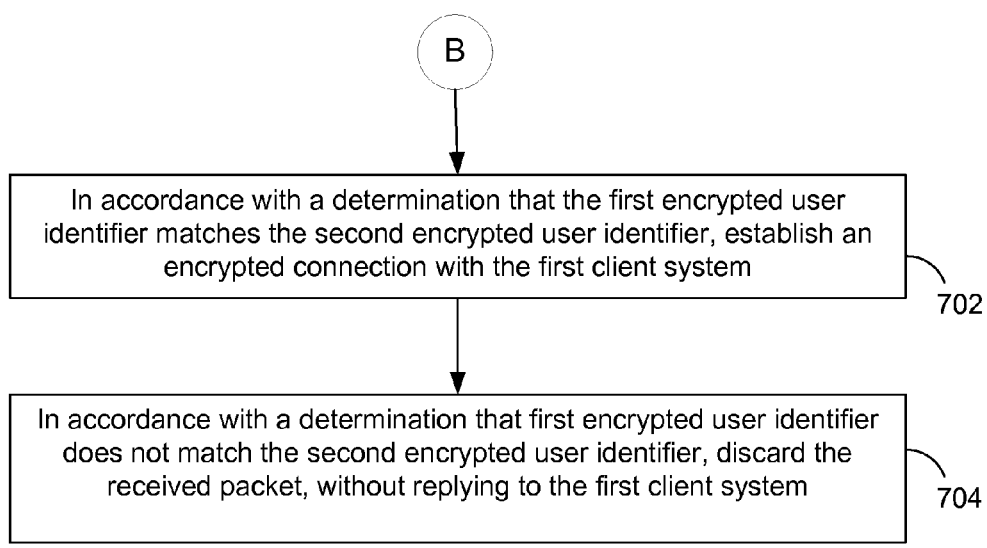
FIG. 7 is a flow diagram illustrating a process for securing communication over a network in accordance with some implementations.

FIG. 7 is a flow diagram illustrating a process for securing communication over a network in accordance with some implementations. Each of the operations shown in FIG. 7 may correspond to instructions stored in a computer memory or computer readable storage medium. Optional operations are indicated by dashed lines (e.g., boxes with dashed-line borders). In some implementations, the method described in FIG. 7 is performed by the server system (FIG. 1, 140).

In some implementations, in accordance with a determination that the first encrypted user identifier matches the second encrypted user identifier, the server system (FIG. 1, 140) establishes an encrypted connection with the first client system (702). The server system (FIG. 1, 140) then uses this connection to transmit the request data or service to the client system (FIG. 1, 102). In some implementations, in accordance with a determination that first encrypted user identifier does not match the second encrypted user identifier, the server system (FIG. 1, 140) discards the received packet, without replying to the first client system (704).

Figure 8:
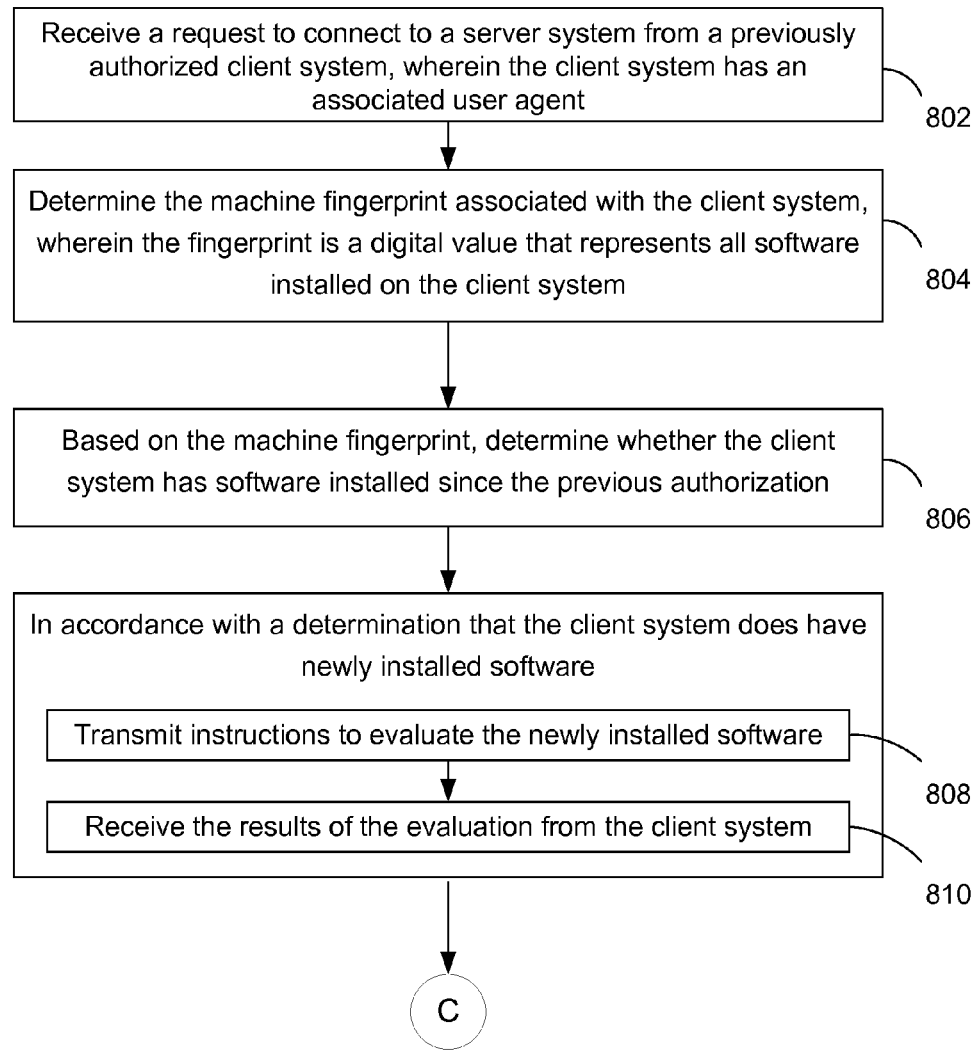
FIG. 8 is a flow diagram illustrating a process for communicating with a trust broker in accordance with some implementations.

FIG. 8 is a flow diagram illustrating a process for communicating with a trust broker in accordance with some implementations. Each of the operations shown in FIG. 8 may correspond to instructions stored in a computer memory or computer readable storage medium. Optional operations are indicated by dashed lines (e.g., boxes with dashed-line borders). In some implementations, the method described in FIG. 8 is performed by the trust broker system (FIG. 1, 130).

In some implementations, the trust broker system (FIG. 1, 130) receives a request to connect to a server system (FIG. 1, 140) from a previously authorized client system (FIG. 1, 102), wherein the client system (FIG. 1, 102) has an associated user agent (FIG. 1, 108) (802). In some implementations, the trust broker system (FIG. 1, 130) determines the machine fingerprint associated with the client system (FIG. 1, 102), wherein the fingerprint is a digital value that represents all software installed on the client system (FIG. 1, 102) (804). For example, in some implementations the digital value is a hash value from performing a hash function on a list of applications installed on the client system (FIG. 1, 102). In some implementations, the trust broker system (FIG. 1, 130) receives the machine fingerprint from a trusted platform module chip on the client system (FIG. 1, 102).

In some implementations, the trust broker system (FIG. 1, 130) determines whether the client system (FIG. 1, 102) has software installed since the previous authorization based on the received machine fingerprint (806). In accordance with a determination that the client system (FIG. 1, 102) does not have newly installed software, the trust broker system (FIG. 1, 130) transmits instructions to evaluate the newly installed software (808). The trust broker system (FIG. 1, 130) receiving the results of the evaluation from the client system (FIG. 1, 102) (810).

Figure 9:
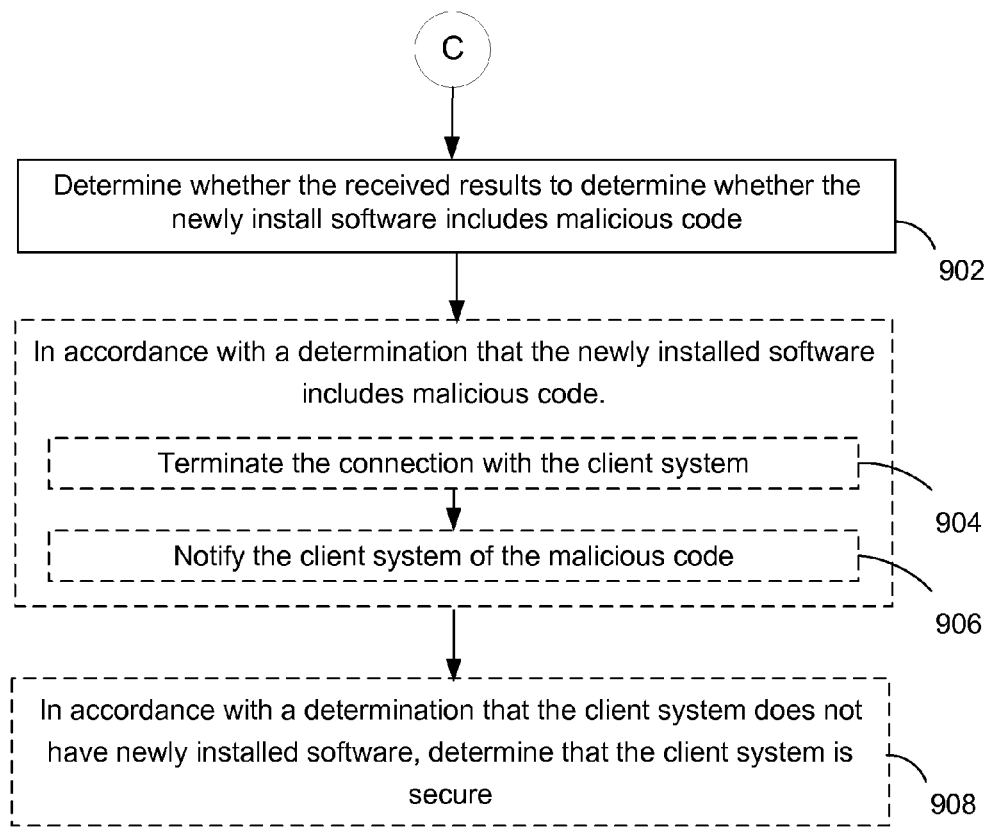
FIG. 9 is a flow diagram illustrating a process for communicating with a trust broker in accordance with some implementations.

FIG. 9 is a flow diagram illustrating a process for communicating with a trust broker in accordance with some implementations. Each of the operations shown in FIG. 9 may correspond to instructions stored in a computer memory or computer readable storage medium. Optional operations are indicated by dashed lines (e.g., boxes with dashed-line borders). In some implementations, the method described in FIG. 9 is performed by the trust broker system (FIG. 1, 130).

In some implementations, the trust broker system (FIG. 1, 130) determines whether the received results indicate that the newly install software includes malicious code (902). In accordance with a determination that the newly installed software includes malicious code, the trust broker system (FIG. 1, 130) terminates the connection with the client system (FIG. 1, 102) (904).

In some implementations, the trust broker system (FIG. 1, 130) notifies the client system (FIG. 1, 102) that the newly installed software includes malicious code (906). In some implementations, the trust broker system (FIG. 1, 130) sends a command to the client system (FIG. 1, 102) that initiates a process to remove the malicious code from the client system (FIG. 1, 102). In accordance with a determination that the client system (FIG. 1, 102) does not have newly installed software, the trust broker system (FIG. 1, 130) determines that the client system is secure (908).

Figure 10:
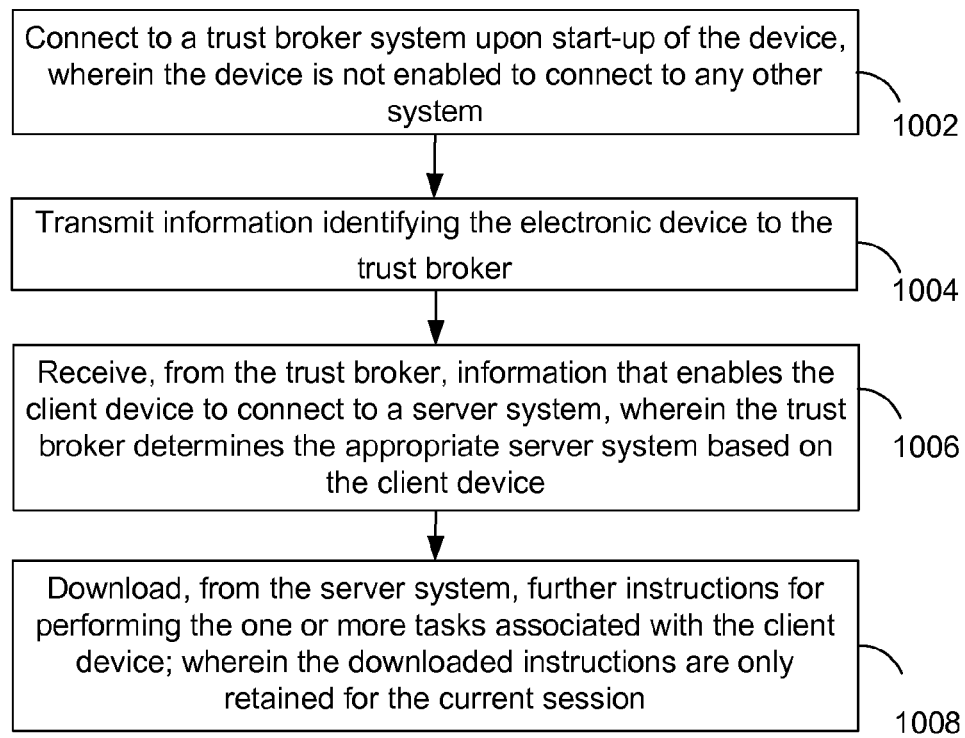
FIG. 10 is a flow diagram illustrating a process for connecting to a trust broker system in accordance with some implementations.

FIG. 10 is a flow diagram illustrating a process for connecting to a trust broker system in accordance with some implementations. Each of the operations shown in FIG. 10 may correspond to instructions stored in a computer memory or computer readable storage medium. Optional operations are indicated by dashed lines (e.g., boxes with dashed-line borders). In some implementations, the method described in FIG. 10 is performed by the client system (FIG. 1, 130).

In some implementations, the client device (FIG. 1, 102) connects to a trust broker system upon start-up of the device, wherein the device is not enabled to connect to any other system (1002). For example, an electronic device, such as a video game console, may be configured to only be able to connect to a network address associated with the manufacturer of the console upon start up. In some implementations, the client device (FIG. 1, 102) does not store any state information. The client device (FIG. 1, 102) transmits information identifying the stateless electronic device (FIG. 1, 102) to the trust broker system (FIG. 1, 130) (1004).

In some implementations, the client device (FIG. 1, 102) receives, from the trust broker system (FIG. 1, 130), information that enables the client device (FIG. 1, 102) to connect to a server system (FIG. 1, 140), wherein the trust broker system (FIG. 1, 130) determines the appropriate server system (FIG. 1, 140) based on the client device (FIG. 1, 102) (1006).

In some implementations, the client device (FIG. 1, 102) downloading, from the server system (FIG. 1, 140), further instructions for performing the one or more tasks associated with the client device (FIG. 1, 102), wherein the downloaded instructions are only retained for the current session (1008). In some implementations, the client device (FIG. 1, 102) no critical network access information is stored at the client device.

Figure 11:
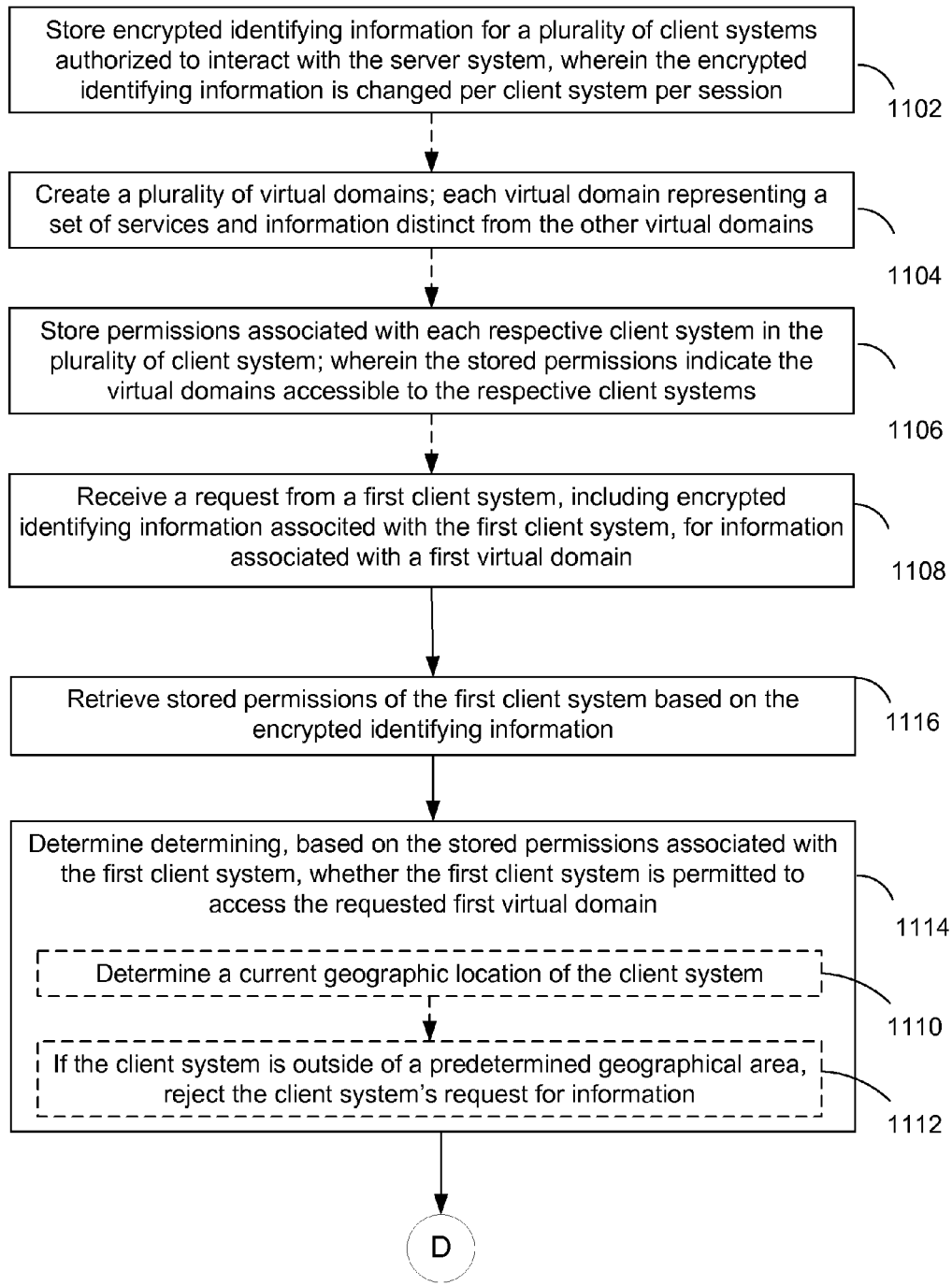
FIG. 11 is a flow diagram illustrating a process for securing communication over a network in accordance with some implementations.

FIG. 11 is a flow diagram illustrating a process for securing communication over a network in accordance with some implementations. Each of the operations shown in FIG. 11 may correspond to instructions stored in a computer memory or computer readable storage medium. Optional operations are indicated by dashed lines (e.g., boxes with dashed-line borders). In some implementations, the method described in FIG. 11 is performed by the server system (FIG. 1, 140).

In some implementations, the server system (FIG. 1, 140) stores encrypted identifying information for a plurality of client systems (FIG. 1, 102) authorized to interact with the server system (FIG. 1, 140), wherein the encrypted identifying information is changed per client system per session (1102). In some implementations, the server system (FIG. 1, 140) creates a plurality of virtual domains; each virtual domain representing a set of services and information distinct from the other virtual domains (1104).

In some implementations, the server system (FIG. 1, 140) stores permissions associated with each respective client system (FIG. 1, 102) in the plurality of client system (FIG. 1, 102), wherein the stored permissions indicate the virtual domains accessible to the respective client systems (FIG. 1, 102) (1106). In some implementations, the server system (FIG. 1, 140) receives a request from a first client system (FIG. 1, 102), including encrypted identifying information associated with the first client system, for information associated with a first virtual domain (1108). The encrypted identifying information allows the client system (FIG. 1, 102) to identify itself to the trust broker system (FIG. 1, 130) without having to rely on values that may vary over time, such as an IP address. If someone is accessing the network from a mobile device while riding a bus, for example, the IP address will change as the bus moves around. The encrypted identifying information stays constant and will allow the trust broker system (FIG. 1, 130) to reliable identity various client systems (FIG. 1, 102).

In some implementations, the server system (FIG. 1, 140) retrieves stored permissions of the first client system (FIG. 1, 102) based on the received encrypted identifying information. In some implementations, the server system (FIG. 1, 140) determines, based on the stored permissions associated with the first client system, whether the first client system is permitted to access the requested first virtual domain (1114). In some implementations, the server system (FIG. 1, 140) determines a current geographic location of the client system (FIG. 1, 102) (1110). If the client system (FIG. 1, 102) is outside of a predetermined geographical area, the server system (FIG. 1, 140) rejects the client system's (FIG. 1, 102) request for information (1112).

Figure 12:
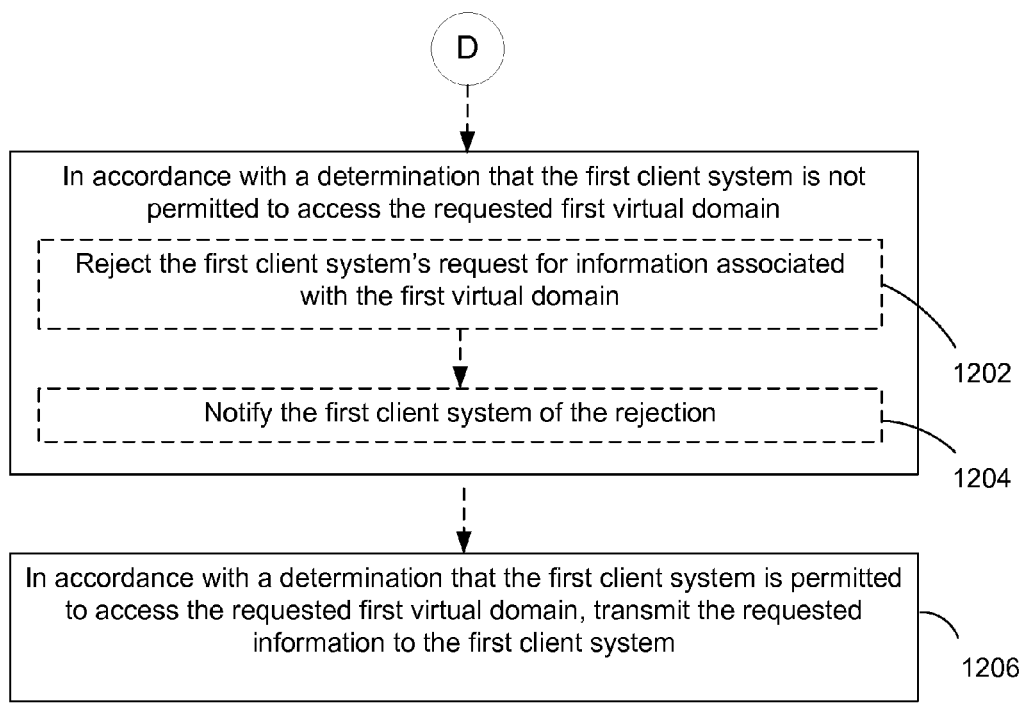
FIG. 12 is a flow diagram illustrating a process for securing communication over a network in accordance with some implementations.

FIG. 12 is a flow diagram illustrating a process for securing communication over a network in accordance with some implementations. Each of the operations shown in FIG. 12 may correspond to instructions stored in a computer memory or computer readable storage medium. Optional operations are indicated by dashed lines (e.g., boxes with dashed-line borders). In some implementations, the method described in FIG. 12 is performed by the server system (FIG. 1, 140).

In some implementations, in accordance with a determination that the first client system (FIG. 1, 102) is not permitted to access the requested first virtual domain, the server system (FIG. 1, 140) rejects the first client's request (FIG. 1, 102) for information associated with the first virtual domain (1202). The server system (FIG. 1, 140) then notifies the first client system (FIG. 1, 102) of the rejection (1204).

In some implementations, in accordance with a determination that the first client system (FIG. 1, 102) is permitted to access the requested first virtual domain, the server system (FIG. 1, 140) transmits the requested information to the first client system (FIG. 1, 102) (1206). In some implementations, communications between the server system (FIG. 1, 140) and the client system (FIG. 1, 102) are encrypted. In some implementations, the permissions are associated with a user of the first client system (FIG. 1, 102). In some implementations, the permissions associated with the user are based on the user's role.

Figure 13:
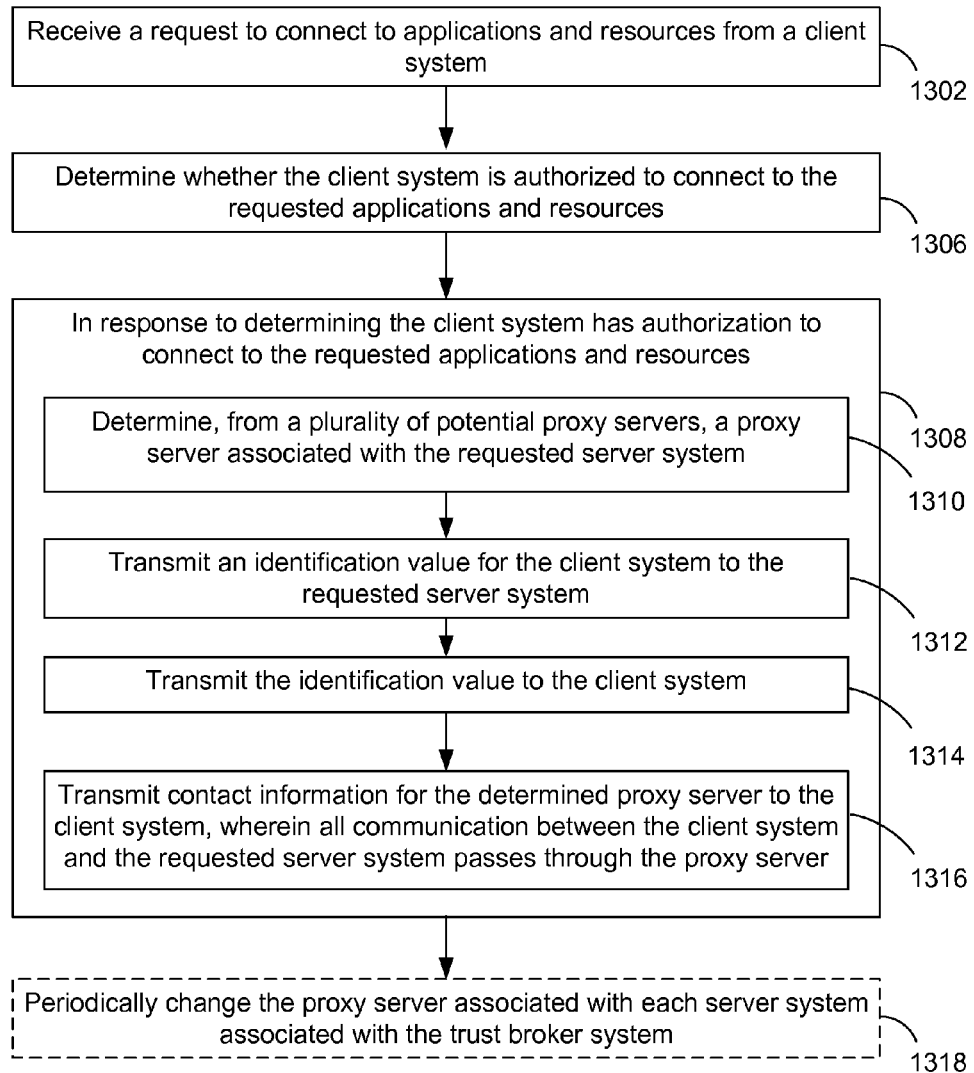
FIG. 13 is a flow diagram illustrating a process for securing communication over a network in accordance with some implementations.

FIG. 13 is a flow diagram illustrating a process for securing communication over a network in accordance with some implementations. Each of the operations shown in FIG. 13 may correspond to instructions stored in a computer memory or computer readable storage medium. Optional operations are indicated by dashed lines (e.g., boxes with dashed-line borders). In some implementations, the method described in FIG. 13 is performed by the trust broker system (FIG. 1, 130).

In some implementations, the trust broker system (FIG. 1, 130) receives a request to connect to applications and resources from a client system (FIG. 1, 102) (1302). The trust broker system (FIG. 1, 130) determines whether the client system (FIG. 1, 120) is authorized to connect to the requested applications and resources (1306). In some implementations, in response to determining the client system has authorization to connect to the requested applications and resources, the trust broker system (FIG. 1, 130) determines, from a plurality of potential proxy servers, a proxy server associated with the requested server system (FIG. 1, 140)) (1310).

In some implementations, the trust broker system (FIG. 1, 130) determines a proxy server associated with the requested server system by determining a specific server system associated with the requested applications and resources by examining a lookup table stored on the trust broker system. In some implementations, the trust broker system (FIG. 1, 130) determines a proxy server associated with the requested server system by determining the proxy server currently associated with the determined server system.

In some implementations, the trust broker system (FIG. 1, 130) determines whether the client system is authorized to connect to the requested applications and resources by determining the identity of a user associated with the client system and determining whether the user associated with the client system is authorized to access the requested applications and resources.

In some implementations, the trust broker system (FIG. 1, 130) transmits an identification value for the client system (FIG. 1, 102) to the requested server system (FIG. 140) (1312). The trust broker system (FIG. 1, 130) transmits the identification value to the client system (1314). The identification value transmitted to a proxy server is an encrypted value associated with the client system (FIG. 1, 102).

In some implementations, the trust broker system (FIG. 1, 130) transmits contact information for the determined proxy server to the client system (FIG. 1), wherein all communication between the client system (FIG. 1, 102) and the requested server system (FIG. 1, 140) passes through the proxy server (1316). In some implementations, the trust broker system (FIG. 1, 130) periodically changes the proxy server associated with each server system (FIG. 1, 140) associated with the trust broker system (FIG. 1, 130) (1318).

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

It will also be understood that, although the terms first, second, etc. may be used herein to describe various elements, these elements should not be limited by these terms.

These terms are only used to distinguish one element from another. For example, a first user could be termed a second user, and, similarly, a second user could be termed a first user, without departing from the scope of the present implementations. The first user and the second user are both users, but they are not the same user.

The terminology used in the description of the implementations herein is for the purpose of describing particular implementations only and is not intended to be limiting. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if (a stated condition or event) is detected" may be construed to mean "upon determining" or "in response to determining" or "upon detecting (the stated condition or event)" or "in response to detecting (the stated condition or event)," depending on the context.

What is claimed is:

1. A method for providing secure access to network resources, comprising:
    at a trust broker system having one or more processors and memory storing one or more programs for execution by the one or more processors:
        receiving, from a client system, a request to access network applications and resources associated with and hosted by a server system;
        locating a first virtual domain of a plurality of virtual domains, wherein:
            each virtual domain provides a respective logical set of network applications and resources, distinct from other virtual domains, wherein a respective logical set of network applications and information corresponds to a subset of network resources provided by the server system; and
            the first virtual domain provides the requested network applications and resources;
        determining whether the client system is authorized to access the first virtual domain based on permissions of a user associated with the client system;
        identifying a particular server of the server system containing the first virtual domain;
        identifying, from a plurality of potential proxy servers, a proxy server currently assigned to the particular server; and
        in response to the determination that the client system is authorized to access the first virtual domain;
            transmitting an identification value for the client system to the identified proxy server, wherein the identification value is an encrypted value identifying the client system; and
            after transmitting the identification value to the identified proxy server, transmitting, to the client system, contact information for connecting to the identified proxy server to access the requested network applications and resources provided by the first virtual domain, wherein the contact information includes one or more session keys, a network address of the identified proxy server, and the identification value.

2. The method of claim 1, further comprising periodically changing the proxy server assigned to the particular server.

3. The method of claim 1, wherein determining whether the client system is authorized to access the first virtual domain comprises:
    determining the identity of the user associated with the client system; and
    retrieving stored permissions of the user associated with the client system.

4. The method of claim 1, wherein the determination of whether the client system is authorized to access the first virtual domain is further based on a geographical location of the client system.

5. The method of claim 1, wherein the determination of whether the client system is authorized to access the first virtual domain is further based on an integrity check of the client system.

6. A trust broker system, comprising:
    one or more processors;
    memory storing one or more programs to be executed by the one or more processors;
    the one or more programs comprising instructions for:
        receiving, from a client system, a request to access network applications and resources associated with and hosted by a server system;
        locating a first virtual domain of a plurality of virtual domains, wherein:
            each virtual domain provides a respective logical set of network applications and resources, distinct from other virtual domains, wherein a respective logical set of network applications and information corresponds to a subset of network resources provided by the server system; and
            the first virtual domain provides the requested network applications and resources;
        determining whether the client system is authorized to access the first virtual domain based on permissions of a user associated with the client system;
        identifying a particular server of the server system containing the first virtual domain;
        identifying, from a plurality of potential proxy servers, a proxy server currently assigned to the particular server; and
        in response to the determination that the client system is authorized to access the first virtual domain;
            transmitting an identification value for the client system to the identified proxy server, wherein the identification value is an encrypted value identifying the client system; and
            after transmitting the identification value to the identified proxy server, transmitting, to the client system, contact information for connecting to the identified proxy server to access the requested network applications and resources provided by the first virtual domain, wherein the contact information includes one or more session keys, a network address of the identified proxy server, and the identification value.

7. The trust broker system of claim 6, wherein the one or more programs further comprise instructions for periodically changing the proxy server assigned to the particular server.

8. The trust broker system of claim 6, wherein determining whether the client system is authorized to access the first virtual domain comprises:
   determining the identity of the user associated with the client system; and
   retrieving stored permissions of the user associated with the client system.

9. The trust broker system of claim 6, wherein the determination of whether the client system is authorized to access the first virtual domain is further based on a geographical location of the client system.

10. The trust broker system of claim 6, wherein the determination of whether the client system is authorized to access the first virtual domain is further based on an integrity check of the client system.

11. A non-transitory computer readable storage medium storing one or more programs configured for execution by a trust broker system, the one or more programs comprising instructions for:
   receiving, from a client system, a request to access network applications and resources associated with and hosted by a server system;
   locating a first virtual domain of a plurality of virtual domains, wherein:
      each virtual domain provides a respective logical set of network applications and resources, distinct from other virtual domains, wherein a respective logical set of network applications and information corresponds to a subset of network resources provided by the server system; and
      the first virtual domain provides the requested network applications and resources;
   determining whether the client system is authorized to access the first virtual domain based on permissions of a user associated with the client system;
   identifying a particular server of the server system containing the first virtual domain;
   identifying, from a plurality of potential proxy servers, a proxy server currently assigned to the particular server; and
   in response to the determination that the client system is authorized to access the first virtual domain;
      transmitting an identification value for the client system to the identified proxy server, wherein the identification value is an encrypted value identifying the client system; and
      after transmitting the identification value to the identified proxy server, transmitting, to the client system, contact information for connecting to the identified proxy server to access the requested network applications and resources provided by the first virtual domain, wherein the contact information includes one or more session keys, a network address of the identified proxy server, and the identification value.

12. The non-transitory computer readable storage medium of claim 11, wherein the one or more programs further comprise instructions for periodically changing the proxy server assigned to the particular server.

13. The non-transitory computer readable storage medium of claim 11, wherein determining whether the client system is authorized to access the first virtual domain comprises:
   determining the identity of the user associated with the client system; and
   retrieving stored permissions of the user associated with the client system.

14. The non-transitory computer readable storage medium of claim 11, wherein the determination of whether the client system is authorized to access the first virtual domain is further based on a geographical location of the client system.

* * * * *